(12) United States Patent
Lau et al.

(10) Patent No.: US 10,313,847 B2
(45) Date of Patent: *Jun. 4, 2019

(54) SESSION ESTABLISHMENT, MAINTENANCE, AND TERMINATION BY END DEVICE BASED ON SMS MESSAGING

(71) Applicant: Verizon Patent and Licensing Inc., Arlington, VA (US)

(72) Inventors: Priscilla Lau, Fremont, CA (US); Rezwanul Azim, Walnut Creek, CA (US); Wing-Cheong V. Yeung, San Ramon, CA (US); Suzann Hua, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,062

(22) Filed: May 3, 2018

(65) Prior Publication Data
US 2018/0255440 A1 Sep. 6, 2018

Related U.S. Application Data

(63) Continuation of application No. 15/202,595, filed on Jul. 6, 2016, now Pat. No. 9,992,643.

(51) Int. Cl.
*H04W 76/02* (2009.01)
*H04W 4/14* (2009.01)
(Continued)

(52) U.S. Cl.
CPC ........... *H04W 4/14* (2013.01); *H04L 65/1006* (2013.01); *H04L 65/1069* (2013.01);
(Continued)

(58) Field of Classification Search
CPC ............. H04L 65/1016; H04L 65/4061; H04L 65/1069; H04L 65/1006; H04L 63/08; H04L 69/28; H04L 12/1467; H04L 29/06027; H04L 61/6054; H04L 63/0272; H04L 63/0281; H04L 63/083; H04L 65/104; H04L 65/1043; H04W 4/10;
(Continued)

(56) References Cited

U.S. PATENT DOCUMENTS 9,191,265 B1    11/2015   McGinn
9,992,643 B2 *   6/2018   Lau ..................... H04M 7/0048
(Continued)

*Primary Examiner* — Quan M Hua

(57) ABSTRACT

A method, a device, and a non-transitory storage medium provide to generate a first Short Message Service (SMS) message, which includes a first Session Initiation Protocol (SIP) message configured to initiate or end a media session that is supported by a control channel and a media channel; transmit, via non-access stratum as the control channel in response to the generation, the first SMS message that includes the first SIP message to a server via a mobility management entity; establish, subsequent to the transmission, an end-to-end connection for the media session using a bearer as the media channel when the first SIP message is configured to initiate the media session; and end, subsequent to the transmission, the media session, when the first SIP message is configured to end the media session.

20 Claims, 14 Drawing Sheets

(51) Int. Cl.
*H04L 29/06* (2006.01)
*H04M 7/00* (2006.01)
*H04W 76/10* (2018.01)

(52) U.S. Cl.
CPC ......... *H04M 7/006* (2013.01); *H04M 7/0048* (2013.01); *H04W 76/10* (2018.02)

(58) Field of Classification Search
CPC ... H04W 76/005; H04W 12/06; H04W 60/00; H04W 60/005; H04W 60/02; H04W 64/003; H04W 76/10; H04W 76/16; H04W 88/06; H04W 88/16; H04M 15/57; H04M 2215/208; H04M 7/0027
See application file for complete search history.

(56) References Cited

U.S. PATENT DOCUMENTS

| | | |
|---|---|---|
| 2007/0211694 A1 | 9/2007 | Rasanen |
| 2007/0258477 A1 | 11/2007 | Huh |
| 2008/0109853 A1 | 5/2008 | Einarsson et al. |
| 2011/0090848 A1 | 4/2011 | Kim et al. |
| 2012/0089680 A1* | 4/2012 | Ono ................... H04L 12/1822 709/204 |
| 2012/0213152 A1 | 8/2012 | Hegarty et al. |
| 2015/0071169 A1 | 3/2015 | Wang |
| 2015/0080035 A1 | 3/2015 | Tanaka et al. |

* cited by examiner

SESSION ESTABLISHMENT, MAINTENANCE, AND TERMINATION BY END DEVICE BASED ON SMS MESSAGING

REFERENCE TO RELATED APPLICATION

This patent application is a continuation of U.S. patent application Ser. No. 15/202,595, entitled "SESSION ESTABLISHMENT, MAINTENANCE, AND TERMINATION BY END DEVICE BASED ON SMS MESSAGING" and filed on Jul. 6, 2016, which is incorporated herein by reference in its entirety.

BACKGROUND

For Voice over Long Term Evolution (VoLTE) or Voice over Internet Protocol (VoIP), call setup signaling in an LTE or IP network includes using a bearer in the user or data plane. For example, a set of control messages may be exchanged between end devices via a default bearer, which may be established based on an Internet Protocol Multimedia Subsystem Access Point Name (IMS APN). Once the call is setup, media of the call may be transferred through a dedicated bearer.

DETAILED DESCRIPTION OF PREFERRED EMBODIMENTS

Figure 1:
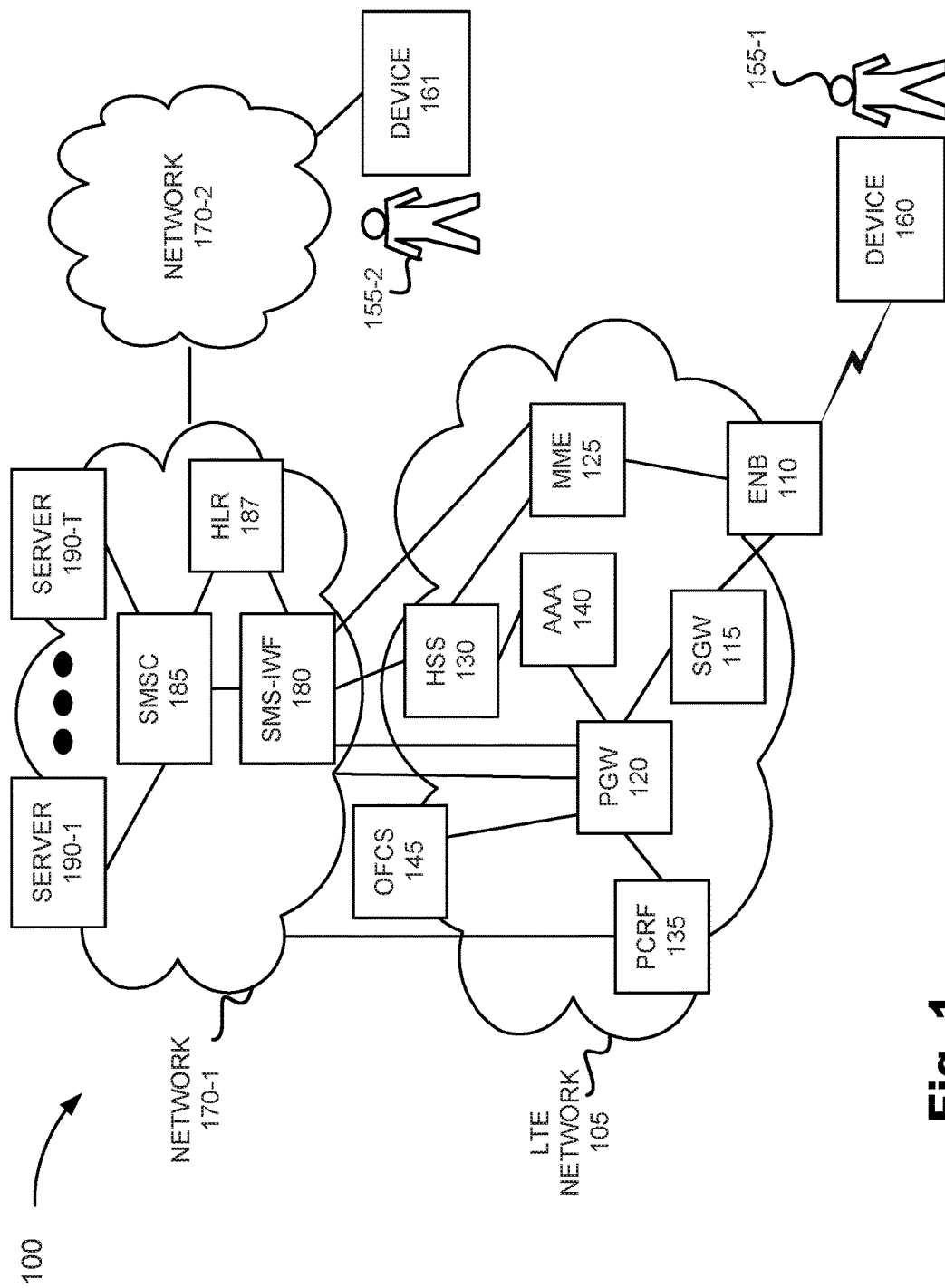
FIG. 1 is a diagram illustrating an exemplary environment in which an exemplary embodiment of a connection control service may be implemented.

The following detailed description refers to the accompanying drawings. The same reference numbers in different drawings may identify the same or similar elements. Also, the following detailed description does not limit the invention.

During a media session setup (e.g., a VoLTE call setup, a Voice over IP (VoIP) call setup, etc.) via LTE and IP networks, a set of control messages are exchanged before a media stream can flow between the parties of the media session. The device may set up a default bearer, based on an IMS APN or other APN, to carry the control signaling (e.g., Session Initiation Protocol (SIP) signaling) of the media session. Once the control signaling portion of the media session is completed via the default bearer, media may be transferred through a dedicated bearer. The default bearer and the dedicated bearer are both in the user plane of the LTE network.

In an LTE network, a default bearer is established between a PDN Gateway (PGW) and a device, whenever the device (e.g., user equipment (UE)) attaches to the LTE network. Thus, the device has an "always on" default bearer for each PGW to which it connects. Unfortunately, the "always on" paradigm is not ideal for all applications. For example, some business, machine-to-machine (M2M), and Internet of Things (IoT) applications may infrequently transmit data and do not want to maintain an "always on" connection. Based on the current procedure, network resources are always pre-allocated as part of an attachment procedure even when the device may not have data to transmit and/or receive. As a result, network resources are unnecessarily wasted or not optimally utilized and scalability of the network is diminished.

According to an exemplary embodiment, a connection control service is described. According to an exemplary embodiment of the connection control service, control signaling of a media session is carried by the user data payload of a Short Message Service (SMS) message via the Non-Access Stratum (NAS) of the control plane in an LTE network. In this way, a user plane connection (e.g., a default bearer) may be omitted for carrying control messages of a media session. For example, a device connected to the LTE network may transmit and receive an SMS message, which includes a control message, via a Mobility Management Entity (MME) using the NAS. The device may establish a PDN connection with the LTE network to support the media flow of the media session (e.g., voice, voice and video, data, etc.) over the user plane which is sometimes also known as the data plane, assuming the PDN connection does not already exist. During the media session, the NAS can be used to carry other types of control signaling, such as SMS messages that include control messages pertaining to call waiting, call hold, call transfer or other types of call management operations (e.g., non-mid-call features, etc.), as well as other features (e.g., interactive voice response (IVR), interactive data sessions, etc.). Further, the NAS can be used to carry SMS messages, which include control messages, for terminating the media session.

According to an exemplary embodiment, the SMS messages are received by and transmitted from the MME to a server (e.g., a media server) via an SMS service. According to an exemplary embodiment, a Short Message Service-Interworking Function (SMS-IWF) and a Short Message Service Center (SMSC) provides the SMS service.

According to an exemplary embodiment, the server provides protocol interworking for control messages, which are encapsulated in the SMS messages, to the required protocol to support delivery to the called/calling party device or other type of device. The server also supports codecs and transcoding. According to an exemplary implementation, a control message includes a Session Initiation Protocol (SIP) message. According to an exemplary implementation, the control message includes Session Description Protocol (SDP) data. According to other exemplary implementations, protocols other than SIP and/or SDP may be used (e.g., H.323, proprietary, Media Gateway Control Protocol (MGCP), etc.).

FIG. 1 is a diagram illustrating an exemplary environment 100 in which an exemplary embodiment of a connection control service may be implemented. As illustrated, environment 100 includes an LTE network 105 that includes an evolved Node B (eNB) 110, a serving gateway (SGW) 115, a packet data network gateway (PGW) 120, an MME 125, a home subscriber server (HSS) 130, and a policy charging and rules function (PCRF) 135. Additionally, environment 100 includes an authentication, authorization, and accounting (AAA) server 140, an offline charging system (OFCS) 145, and networks 170-1 and 170-2 (also referred to collectively as networks 170 and, individually or generally as network 170). Network 170-1 includes a Short Messaging Service-Interworking Function (SMS-IWF) 180, a Short Messaging Service Center (SMSC) 185, a Home Location Register (HLR) 187, and servers 190-1 through 190-T (also referred to collectively as servers 190, and individually or generally as server 190). Also, environment 100 includes a device 160 and a device 161. User 155-1 may operate device 160 and user 155-2 may operate device 161. Users 155-1 and 155-2 may also be referred to as users 155 and, individually and generically as user 155.

Environment 100 may be implemented to include wired, optical, and/or wireless connections among the devices and the networks illustrated. A connection may be direct or indirect and may involve an intermediary device not illustrated in FIG. 1. For example, environment 100 may include a femto device, a pico device, a home eNB, a Node B, a serving GPRS support node (SGSN), a gateway GPRS support node (GGSN), or other network element. Additionally, or alternatively, a connection may involve an intermediary network not illustrated in FIG. 1. For example, environment 100 may include an internetworking between LTE network 105 and another network (e.g., a 2G network, a 2.5G network, a 3G network, a 3.5G network, etc.). Additionally, the number, type (e.g., wired, wireless, etc.), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. Additionally, or alternatively, environment 100 may include an additional network and/or differently arranged networks, than those illustrated in FIG. 1. Also, according to other embodiments, one or more functions and/or processes described as being performed by a particular device may be performed by a different device, or some combination of devices. For example, a network element (SMS-IWF 180, etc.) and another network element (e.g., MME 125, etc.) may be implemented on a same network device. Alternatively, a network element illustrated in FIG. 1 may be implemented on a network device as a stand-alone.

LTE network 105 includes a network defined by a Third Generation Partnership Project (3GPP) specification or LTE architecture. ENB 110, SGW 115, PGW 120, MME 125, and PCRF 135 may each operate according to an LTE specification or architecture. According to other exemplary embodiments, LTE network 105 may include additional, fewer, and/or different network elements than those illustrated. According to an exemplary embodiment, the NAS signaling in the control plane of LTE network 105 provides support for the connection control service, as described herein.

HSS 130 stores user subscription or user profile data. HSS 130 may also perform other services (e.g., authentication, authorization, etc.). AAA 140 includes a device that provides authentication, authorization, and accounting services. OFCS 145 includes a device that provides an off-line charging service that includes the generation of charging data records (CDRs) for the billing system.

Device 160 includes a device with computational and wireless communication capabilities. Device 160 may be implemented as a mobile device, a portable device, a wearable device, a stationary device, or some other type of end device. For example, device 160 may be implemented as a smartphone, a mobile telephone, a personal digital assistant, a tablet, a netbook, a phablet, a computer (e.g., a palmtop, a laptop, etc.), an infotainment system in a vehicle, a wearable device (e.g., a watch, glasses, etc.), or a Voice over Internet Protocol (VoIP) device. Alternatively, device 160 may be implemented as a cellular Internet of Things (cIoT) device or a machine-type communication (MTC) device.

According to an exemplary embodiment, device 160 stores one or multiple end user applications. For example, device 160 may include a telephony application, a multimedia application, a video call application, a web browsing application, a social networking application, a conferencing application, a short message service application, and/or other types of end user applications. Device 160 includes a protocol stack that is used to connect to and use a network service. For example, the protocol stack may include a set of libraries, executables, and/or a program to provide networking capabilities. Examples of a protocol stack include a SIP stack, an IMS stack, an LTE stack, etc.

According to an exemplary embodiment, device 160 provides a connection control service, as described herein. According to an exemplary embodiment, the connection control service is used in support of media sessions. The phrase "media session" is a session in which a control or signaling channel and a media channel is used to support a communication or information exchange from one point to another point. The control channel and the media channel are usually separate and distinct channels. Additionally, the control channel and the media channel may traverse different network paths. The media may include voice, video, and/or data other than voice and video (e.g., text, dual-tone multi-frequency (DTMF data, etc.)). Examples of a media session include a voice communication (e.g., a telephone call), a voice and video communication, an IVR communication, and an interactive data communication.

Device 161 may include a device with computational and communication capability. Device 161 may be implemented as device 160, as described herein. Alternatively, device 161 may include a user device that does not have wireless communication capability. For example, unlike device 160, device 161 may be implemented as a landline telephone or other type of user device that allows the user to participate in a media session.

Network 170 includes one or multiple networks of one or multiple types. For example, network 170 may be implemented as a service or application-layer network, the Internet, an IMS network, a cloud network, a packet-switched network, a Public Switched Telephone Network (PSTN), a Signaling System No. 7 (SS7) network, a telephone network, a private network, a public network, a telecommunication network, an IP network, a wired network, a wireless network, or some combination thereof. Network 170 may be owned or operated by the same operator as the LTE network 105.

SMS-IWF 180 includes a network device that acts as an intermediary device between a wireless network (e.g., LTE network 105) and an SMS application/service. For example, SMS-IWF 180 is an intermediary unit between MME 125 and SMSC 185. According to such an implementation, SMS-IWF 180 may include a 3GPP SGS interface with MME 125 and an SS7 MAP interface with SMSC 185. SMS-IWF 180 may provide a mobile originated (MO) SMS service and a mobile terminated (MT) SMS service.

SMSC 185 includes a network device that acts as an intermediary device between SMS-IWF 180 and server 190. SMSC 185 may provide various functions, such as storing and forwarding of SMS messages, and routing and delivering of SMS messages that a common Short Message Service Center (SMSC) and/or an SMS Gateway MSC (SMS-GWMSC) may perform.

HLR 187 includes a network device that provides a service of a combined attach to support SMS/NAS procedure. When device 160 requests attachment to LTE network 105, device 160 may request to attach to HLR 187 at the same time (i.e., a combined attach). After MME 125 has completed the LTE attach procedure, MME 125 selects an SMS-IWF 180 and sends a GSM MAP Update Location message to SMS-IWF 180. SMS-IWF 180 acts as the serving MSC and forwards the GSM MAP Update Location message to HLR 187. As a result, HLR 187 will register device 160 and store the address of SMS-IWF 180. For example, when SMSC 185 receives an SMS message, which may contain a SIP message destined for device 160, SMSC 185 will send a GSM MAP Sending Routing Info For SM message to HLR 187 to query the routing information of device 160. In response, HLR 187 will send back the address of SMS-IWF 180, and SMSC 185 will then forward the received SMS message to SMS-IWF 180. SMS-IWF 180 may then forward the SMS message to MME 125. MME 125 forwards the message using NAS channel to device 160 via eNB 110.

Server 190 includes a network device that provides a service through which users may participate in a media session. For example, server 190 may be implemented as a call processing server (CPS), a voice and video conferencing device, a VoIP server, an IVR device, or other type of network device that supports single media or multimedia exchanges.

Figure 2:
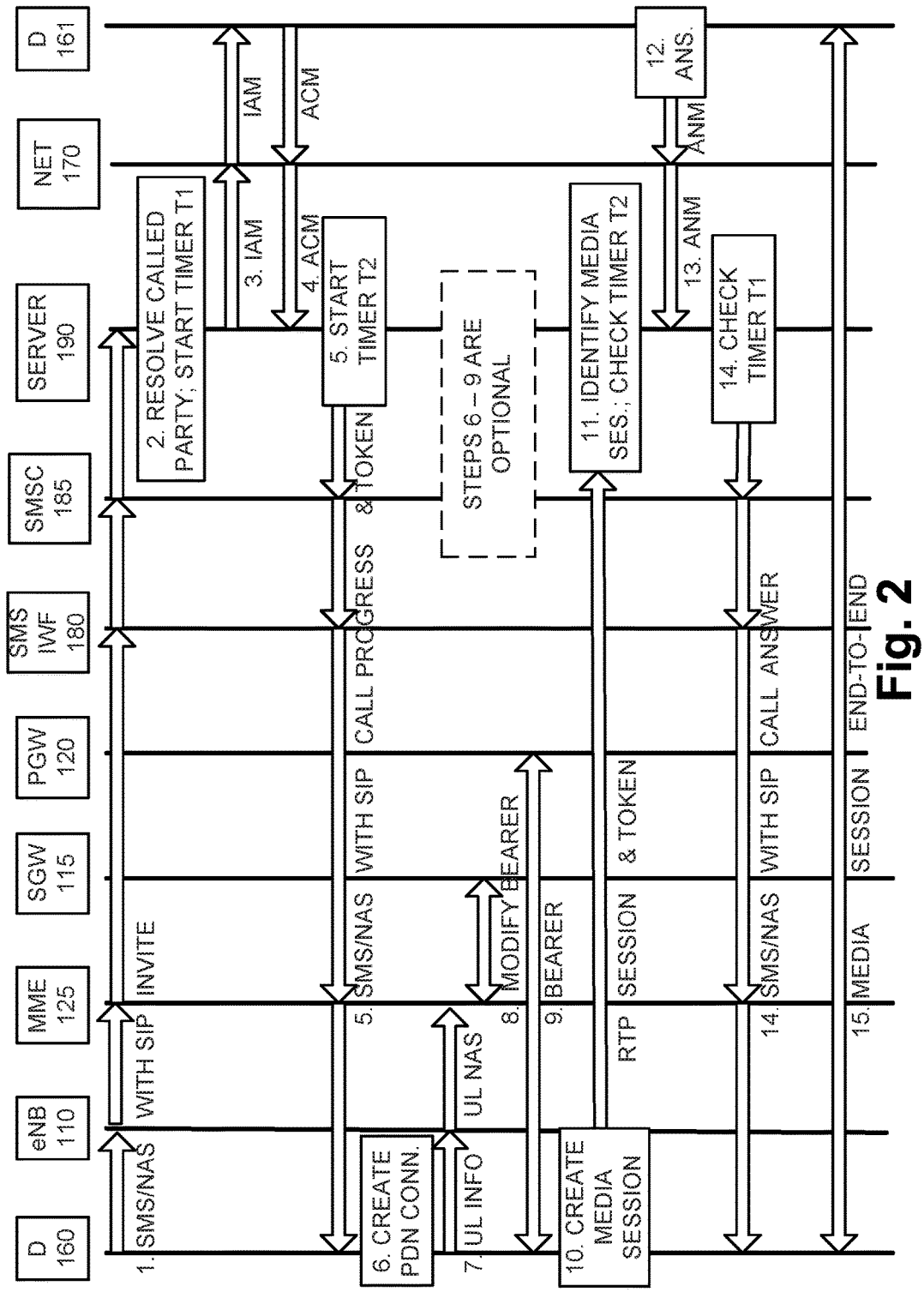
FIG. 2 is a messaging diagram illustrating an exemplary embodiment of the connection control service to establish a media session according to a mobile originated scenario.

FIG. 2 is a diagram illustrating an exemplary embodiment of the connection control service. The messages explained and illustrated are exemplary and pertain to a mobile originating call scenario. It may be assumed that device 160 is connected to or camped on a cell of eNB 110. Device 160 may or may not have a bearer established. For example, device 160 may not have a default bearer established. According to an exemplary scenario, assume that user 155 is operating device 160 and wishes to place a telephone call or a voice and video call to device 161. In response to dialing a telephone number via a keypad, in step (1), device 160 generates an SMS message that includes a SIP INVITE. The SMS message includes various types of session description data, such as the called party number, the calling party number, a timestamp, etc. The SIP INVITE may be encapsulated in the payload portion of the SMS message. The SMS message may include a request for an authentication token (referred to herein as "token") which may be used to correlate the call data with the bearer connection later. Device 160 and server 190 may perform an authentication procedure, using any well-known authentication method. However, further authentication in addition to the standard authentication performed during an LTE attach procedure is an optional procedure. Device 160 transmits the SMS message using the NAS to MME 125 via eNB 110.

In response to receiving and interpreting the SMS message, MME 125 transmits the SMS message to SMS-IWF 180, and the SMS message is subsequently transmitted to server 190 via SMSC 185. In step (2), in response to receiving and interpreting the SMS message that includes the SIP INVITE, server 190 resolves the called party number. Server 190 stores details of the call request. For example, server 190 may include a database that stores data pertaining to media sessions. Upon receiving the SMS message, server 190 may start a timer T1 that represents a time window that server 190 will wait for call answer from device 161, this will approximately be equivalent to the time that device 160 and device 161 can take to setup the call end to end. Once timer T1 expires, the stored call data may be considered stale and may be deleted by server 190. Also, server 190 may start a timer T2 that represents the maximum duration that server 190 will allow for device 160 to setup a media session via a bearer connection in the user plane of LTE network 105 toward server 190. Timer T2 may have either the same value or a smaller value than timer T1. According to an exemplary implementation, in step (2), when device 160 is successfully authenticated if applicable, server 190 determines how to reach device 161 associated with the called party. In this example, device 161 is served by a PSTN network (e.g., included in network 170-2) and uses Integrated Services Digital Network User Part (ISUP) signaling for call setup. Server 190 may support SIP and ISUP signaling interworking for this call. In step (3), according to this example, in response to resolving the called party number, server 190 launches a call setup request toward device 161 by generating an ISUP Initial Address Message (IAM) based on the call data in the SIP INVITE message received from the originating device 160. In step (4), device 161 receives the ISUP IAM and starts setting up the media path toward server 190. In response to receiving and interpreting the ISUP IAM, device 161 generates and transmits an ISUP Address Complete Message (ACM) to server 190 via network 170.

In step (5), server 190 receives the ISUP ACM from device 161. In response to receiving and interpreting the ISUP ACM, server 190 generates an SMS message, which includes a SIP message in the payload. For example, the SIP message may be a 180 Alerting message (e.g., ringing) or a 183 Session Progress message, depending on which end will provide ring back tone to the caller at device 160. In this example, network 170 (e.g., a PSTN) that serves device 161 will provide an in-band ring back tone to server 190. However, a connection between server 190 and device 160 is required for the ring back tone to be transmitted to device 160. If the user plane connection between device 160 and server 190 has been established, then server 190 may send a SIP 183 message if the ring back tone is to be provided by server 190 or by the terminating network serving device 161. In such a case, server 190 will bridge the connection between sever 190 with device 161 and the user plane connection between server 190 to device 160 so as to allow the ring back tone to flow to device 160 via the user plane connection through PGW 120, SGW 115, and eNB 110 to device 160 for the caller (i.e., user 155-1). According to another example, when the user plane connection has not been established or the ring back tone is to be provided locally at device 160, server 190 will send a SIP 180 Alerting message in response to the previously received SIP INVITE message from device 160 by encapsulating the SIP 180 Alerting message in an SMS message to device 160. In the same SMS message, server 190 includes a token uniquely identifying the call being setup. Server 190 may start Timer T2 which specifies the interval that the token is valid. Optionally, instead of in step 5, server 190 may start timer T2 in step 2. In this regard, timers T1 and T2 may be started concurrently or at different times. Also, the SMS message may include the value of timer T1 and/or timer T2. Server 190 transmits the SMS message, which includes the SIP 180 Alerting message, to device 160 via SMSC 185, SMS-IWF 180, MME 125, and eNB 110. Upon receiving the SIP 180 Alerting message, device 160 will generate ring back tone locally for user 155-1.

In step 6, device 160 receives the SMS message through the NAS from server 190 via SMSC 185, SMS-IWF 180, MME 125, and eNB 110. In response, device 160 determines whether to establish a PDN connection in the user plane to support the media portion of the call. For example, device 160 determines whether an active PDN connection exists that can be used. By way of further example, there may be a PDN connection that exists, but the PDN connection is being used for another session. Alternatively, there may be a PDN connection that exists and it is not being used, but the PDN connection does not have suitable characteristics (e.g., Guaranteed Bit Rate (GBR), etc.) that would support the media portion of the media session. Still further, device 160 may not have any bearer established. When device 160 determines that an active PDN connection exists that can be used to carry the media portion of the call, the process may skip to step (10). According to this example, assume that a PDN connection does not exist. Additionally, according to this example, assume that device 160 determines to establish a default bearer. In steps (6)-(9), a default bearer is established, which includes an exchange of messages between device 160 and network elements of LTE network 105. For the sake of brevity, FIG. 2 illustrates only some of the exemplary messages that may be exchanged. According to other examples, device 160 may establish a dedicated bearer.

In step (10), in response to the establishment of the default bearer, device 160 creates the media connection portion of the media session with server 190 via the default bearer. For example, device 160 uses the Real Time Protocol (RTP) to establish the media connection with server 190 and sends the token to the server 190. In step (11), server 190 identifies the incoming request as related to the call in progress based on the token. For example, server 190 may determine that the token is valid based on call details stored by server 190 if timer T2 has not expired (i.e., server 190 may check timer T2 to determine whether timer T2 has expired or not). Additionally, server 190 may use the token to correlate the user plane connection through PGW 120 with the call requested by device 160 to device 161 via SMS message over the control plane. According to this example, assume that the request was received within the time window of timer T2 and server 190 determines that the request is valid.

Depending on the progress of the call at device 161, device 160 may continue to play the ringing tone until the call is answered at device 161. According to this example, in step (12), the call is answered and, in step (13), device 161 generates and transmits an Answer Message (ANM) to server 190 via network 170. In step (14), server 190 receives the ANM and stops-playing the ringing tone, if applicable. Additionally, in response to the receipt of the ANM, server 190 generates an SMS message. The SMS message includes a SIP 200 OK message indicating the call has been answered. Server 190 transmits the SMS message to device 160 through SMSC 185, SMS-IWF 180, MME 125 and eNB 110. Device 160 will send a SIP ACK message inside an SMS message to server 190 acknowledging the SIP 200 OK message. In step 15, upon receiving the SIP ACK message from device 160 and providing that timer T2 has not expired, server 190 will bridge the user plane connections from device 160 and device 161 to allow end-to-end user plane connectivity between device 160 and device 161 so that RTP packets may start flowing from both ends. At this point, the call has been setup successfully, and User 155-1 and user 155-2 may talk to each other.

Timer T2 is to ensure that device 160 will be able to establish a media connection via LTE network 105 with server 190 in a timely manner. If for any reason T2 has expired before device 160 can setup the media connection to server 190 (e.g., device 160 is busy or there is no resource in LTE network 105 to establish the required media connection for the call), then server 190 may determine that the call has failed without waiting for the expiration of timer T1 and take appropriate actions such as release the call in progress, notify device 161, keep call failure statistics, etc.

Timer T1 is to ensure that user 155-2 at device 161 has answered the incoming call and the media session between device 160 and device 161 is established within a reasonable amount time. For example, timer T1 may be configured to a period such as 15-60 seconds. When timer T1 has expired and the call has not be answered, server 190 will consider that call setup has failed and release the existing user plane connection(s) with device 160 and device 161 by initiating a release procedure, which may include appropriate signaling toward device 160 and device 161. Server 190 may release any resources previously allocated to the media session on server 190. For example, server 190 may send a SIP BYE message in an SMS message to device 160 and an ISUP RELEASE message to device 161. This is to avoid any stale session and hung resources in the network. It should be noted that, under a normal situation, if user 155-2 at device 161 does not answer the incoming call for a period of time, the call will be answered by a voice mail system serving user 155-2. Therefore, timer T1 will expiry only under some usual situations.

While FIG. 2 illustrates exemplary messaging and describes exemplary processes that provide the connection control service, according to other embodiments, device 160, network elements of LTE network 105 (e.g., MME 125, etc.), SMSC 185 and/or server 190 may perform additional, different, and/or fewer operations to provide the connection control service. For example, device 160 may register with server 190 and SMSC 185 may query the routing information for device 160 in order to deliver the mobile terminating SMS message to SMS-IWF 180 (not shown in FIG. 2). Additionally, or alternatively, the connection control service may include a query to HSS 130, an ENUM lookup, etc. Additionally, various operations and messaging illustrated in FIG. 2 and described herein may be performed concurrently.

Figure 3:
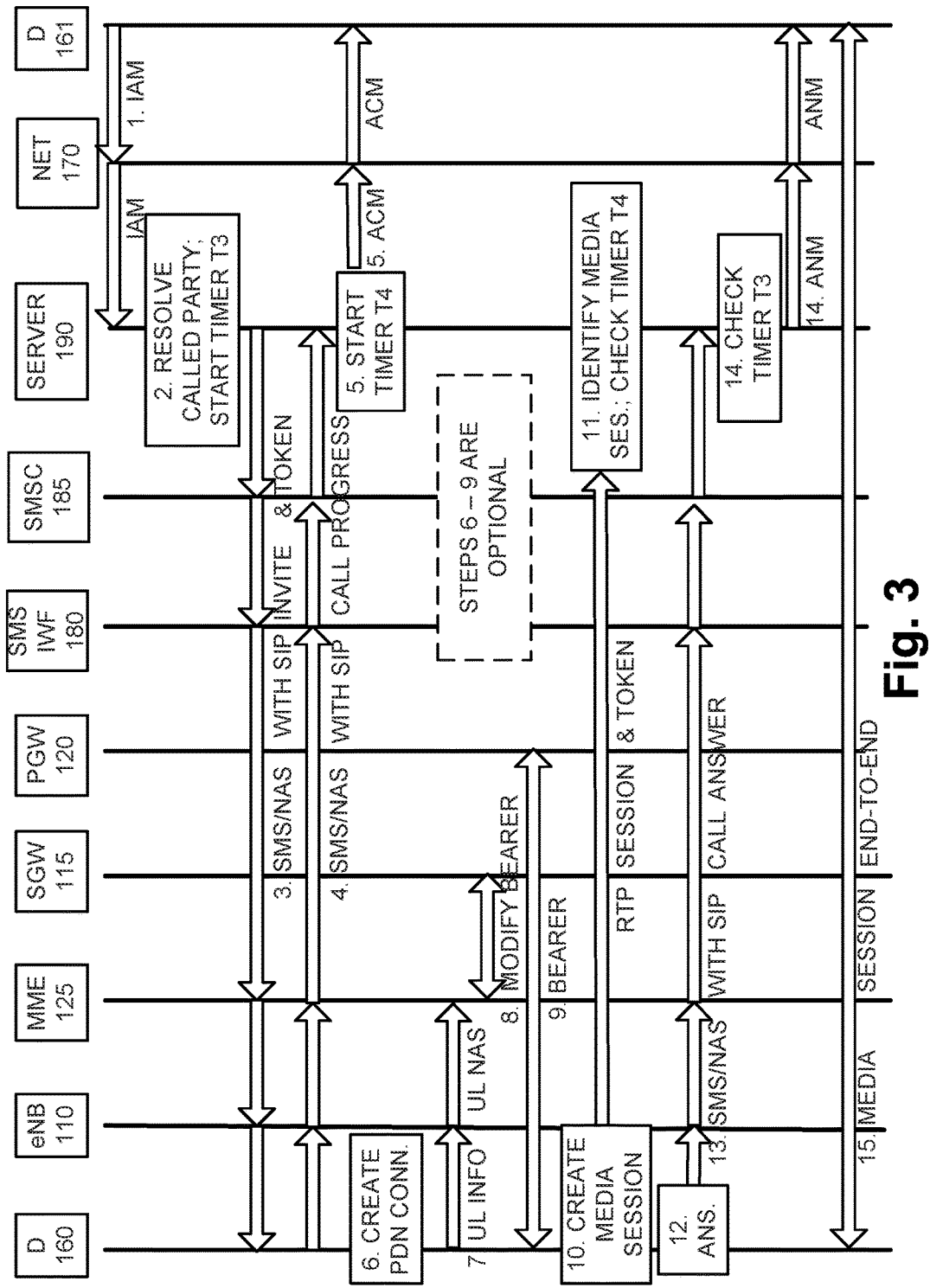
FIG. 3 is a messaging diagram illustrating an exemplary embodiment of the connection control service to establish a media session according to a mobile terminated scenario.

FIG. 3 is a diagram illustrating another exemplary embodiment of the connection control service. The messages explained and illustrated are exemplary and pertain to a mobile terminating call scenario. It may be assumed that device 160 is camped on a cell of eNB 110. Device 160 may or may not have a bearer established. According to an exemplary scenario, assume that user 155 is operating device 161 and wishes to place a telephone call or a voice and video call to device 160. In response to dialing a telephone number via a keypad, in step (1), device 161 or an intermediary device between device 161 and server 190 generates an ISUP IAM, which is transmitted to server 190 according to the telephone number assigned to device 160 via network 170. The ISUP IAM carries various parameters pertaining to call setup, such as the calling party, the called party, and other parameters (e.g., connection indicators, forward call indicators, etc.). In step (2), in response to receiving and interpreting the ISUP IAM, server 190 stores details of the call request and resolves the called party number and starts timer T3 which has similar function as timer T1 in the example of an outgoing call. Although not illustrated, step (2) may include server 190 querying HLR 187 to determine if device 160 is reachable at that time. In step (3), according to this example, assuming device 160 is registered with HLR 187 so that device 160 is available to receive the incoming call from device 161, server 190 generates an SMS message to the called device 160 and starts a timer T4 which has similar function as timer T2 in the example of the outgoing call. The SMS message includes a SIP INVITE and a token that may be used to correlate the call data with the user plane connection that device 160 will setup to server 190. The SMS message includes various types of session description data, such as the calling party number, a timestamp, and other parameters for call setup used in SIP. Server 190 transmits the SMS message to device 160 via SMSC 185, SMS-IWF 180, MME 125, and eNB 110 through the NAS. Server 190 may store the call data. Referring back to step (2), if device 160 is not registered with HLR 187, server 190 may connect the calling user (e.g., user 155-2) to an announcement indicating that the called party (e.g., user 155-1) is not available to receive the call at the present time and then release the incoming call. Alternatively, server 190 may connect the calling user to a voice system so that the calling party can leave a voice message before releasing the call from device 161. According to an exemplary implementation, server 190 may not verify the availability of device 160 before sending the SMS message carrying the SIP INVITE message to device 160. In this case, server 190 may provide the above call treatments (e.g., connecting the call to a voice mail system) when it receives indication from SMSC 185 that the SMS message was not delivered successfully to device 160. Referring to step (3), upon receiving the SIP INVITE message inside the SMS message, device 160 will alert user 155-1 that there is an incoming call.

In step (4), in response to receiving and interpreting the SMS message, device 160 generates and transmits an SMS message that includes a SIP message through the NAS. For example, the SIP message may be a 180 message (e.g., ringing) or other SIP message pertaining to session progress.

In step (5), in response to receiving and interpreting the SMS message from device 160, server 190 generates an ISUP ACM. Server 190 transmits the ISUP ACM to device 161 via network 170. As in this example, the originating network is a PTSN network and using ISUP signaling for call setup, server 190 may connect device 161 to a ring back tone generator so that ring back tone is provided to calling user 155-2 at device 161.

In step (6), in response to transmitting the SMS message to server 190, device 160 determines whether to establish a PDN connection in the user plane to support the media portion of the call. For example, device 160 determines whether an active PDN connection exists that can be used in manner similar to that previously described in relation to FIG. 2. When device 160 determines that an active PDN connection exists that can be used to carry the media portion of the call, the process may skip to step (10). According to this example, assume that a PDN connection does not exist. Additionally, according to this example, assume that device 160 determines to establish a default bearer. In steps (6)-(9), a default bearer is established, which includes an exchange of messages between device 160 and network elements of LTE network 105. For the sake of brevity, FIG. 3 illustrates only some of the messages that may be exchanged. When the bearer is available through eNB 110, SGW 115, and PGW 120, in step (10), device 160 may set up the user plane connection to server 190 and send the received token in step (3) to server 190. In step (11), server 190 may use the token to correlate the user plane connection with the incoming call from device 161, if T4 has not expired (e.g., server 190 may check timer T4 to determine whether timer T4 has expired or not). If timer T4 has expired, server 190 may release the call by sending an SMS message with an appropriate SIP signaling message in an SMS message via NAS to called device 160 and an ISUP Call Release message to calling device 161.

In step (12), user 155-1 answers the call at device 160. Step (12) is independent from steps (6-11) and may happen simultaneously. In step (13), in response to user 155-1 answering the call, device 160 generates an SMS message. The SMS message includes a SIP message. For example, the SIP message may be implemented as a SIP 200 OK. Device 160 transmits the SMS message to server 190 through the NAS. In step (14), server 190 receives the SMS message. If step (10) has been completed so that the user plane connection between device 160 and server 190 has already been established via eNB 110, SGW 115, and PGW 120, and timer T3 has not expired (e.g., server 190 checks timer T3 to determine whether timer T3 has expired or not), then server 190 stops the ringing tone toward device 160 and bridges the connection from called device 160 with the connection from calling device 161. In step 14, server 190 generates and transmits an ISUP ANM to device 161 via network 170, indicating the called party has answered the call. In step (15), calling device 161 has an end-to-end user plane connection with called device 160, and user 155-1 and user 155-2 may talk to each other.

While FIG. 3 illustrates exemplary messaging and describes exemplary processes that provide the connection control service, according to other embodiments, device 160, network elements of LTE network 105 (e.g., MME 125, etc.), and/or server 190 may perform additional, different, and/or fewer operations to provide the connection control service. For example, device 160 may register with server 190. Additionally, or alternatively, the connection control service may include a query to HSS 130, HLR 187, an ENUM lookup, etc. Additionally, various operations and messaging illustrated in FIG. 3 and described herein may be performed concurrently. Timers T3 and T4 may be started concurrently or at different times.

Figure 4:
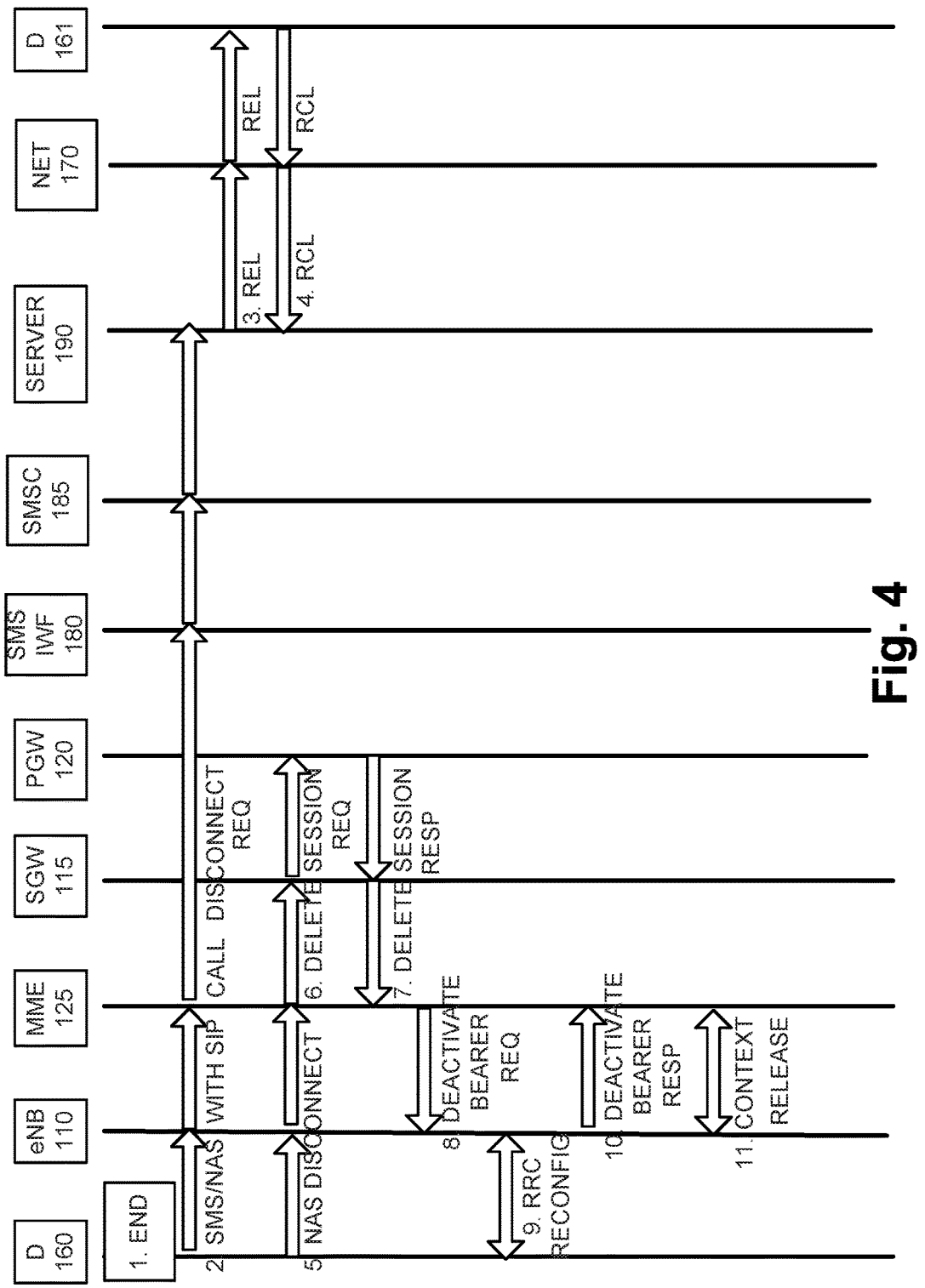
FIG. 4 is a messaging diagram illustrating an exemplary embodiment of the connection control service to end a media session according to a mobile originated scenario.

FIG. 4 is a diagram illustrating yet another exemplary embodiment of the connection control service. The messages explained and illustrated are exemplary and pertain to a call teardown. In step (1), user 155 ends a call via device 160. For example, user 155 enters a user input via device 160 to terminate the communication session. In step (2), in response, device 160 generates an SMS message. The SMS message includes a SIP message. For example, the SIP message is a SIP BYE to terminate the call. Device 160 transmits the SMS message using the NAS to MME 125 via eNB 110, which subsequently propagates to server 190 via SMS-IWF 180 and SMSC 185. In step (3), in response to receiving and interpreting the SMS message, server 190 generates and transmits a release message (REL) to device

161 via network 170. In step (4), in response to receiving and interpreting the REL, device 161 or an intermediary device generates and transmits a release complete message (RLC) to server 190. In step (5), device 160 may initiate a PDN disconnection, in which various messages are exchanged to tear down the bearer in steps (6) through (11).

While FIG. 4 illustrates exemplary messaging and describes exemplary processes that provide the connection control service, according to other embodiments, device 160, network elements of LTE network 105 (e.g., MME 125, etc.), and/or server 190 may perform additional, different, and/or fewer operations to provide the connection control service.

Figure 5:
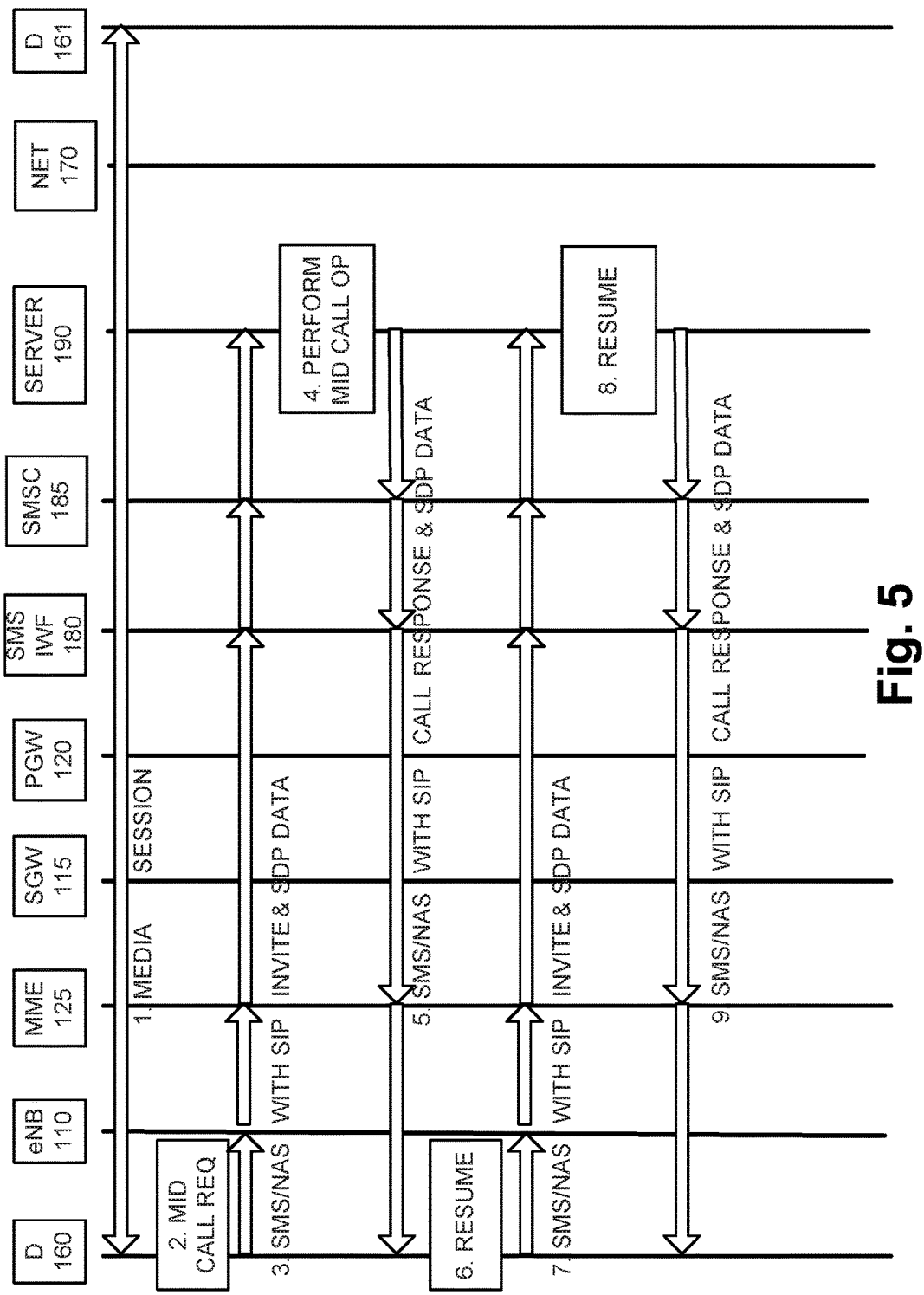
FIG. 5 is a messaging diagram illustrating an exemplary embodiment of the connection control service to perform a mid-media session operation.

FIG. 5 is a diagram illustrating still another exemplary embodiment of the connection control service. The messages explained and illustrated are exemplary and pertain to a mid-call operation. In step (1) assume that device 160 and device 161 are conducting a media session. In step (2), user 155 initiates a mid-call request via device 160. For example, as previously described, various mid-call operations such as call waiting, initiate multiple calls, call hold, call transfer, conference calling, IVR, interactive data sessions, and other types of mid-call control and operations may be invoked during a media session. Depending on the type of mid-call operation, various SIP messages may be implemented to support the execution of the mid-call operation, such as, for example, a SIP INVITE, a SIP INFO, a SIP NOTIFY, and a SIP SUBSCRIBE. However, the SMS message may include any SIP message that is configured to indicate a particular mid-call operation. Additionally, the SMS message may include SDP data. According to this example, assume that the mid-call operation is a call hold. In step (3), in response to receiving the mid-call request, device 160 generates an SMS message. The SMS message includes a SIP message. For example, the SIP message may be implemented as a SIP INVITE message. Additionally, the SMS message includes SDP data (e.g., "a=sendonly" attribute). Device 160 transmits the SMS message to server 190 through the NAS to server 190.

In step (4), in response to receiving and interpreting the SMS message, server 190 performs the corresponding mid-call operation (e.g., call hold). Server 190 may also play a hold announcement or tone for user 155 of device 161 or transmit signaling to device 161 to indicate a call hold depending on the type of device 161. In step (5), also in response to receiving and interpreting the SMS message, server 190 generates an SMS message. The SMS message includes a SIP message. For example, the SIP message may be implemented as a 200 OK. Additionally, the SMS message includes SDP data (e.g., "a=recvonly" attribute). Server 190 transmits the SMS message to device 160 through the NAS. Additionally, the media session is suspended due to the call hold. In step (6), assume user 155 initiates another mid-call request via device 160. According to this example, the mid-call request is a resume back to the call put on hold. In step (7), in response to receiving the mid-call request, device 160 generates an SMS message. The SMS message includes a SIP message. For example, the SIP message may be implemented as a SIP INVITE. Additionally, the SMS message includes SDP data (e.g., "a=sendrecv" attribute). Device 160 transmits the SMS message to server 190 through the NAS to server 190. In step (8), in response to receiving and interpreting the SMS message, server 190 resumes the call that was placed on hold. Depending on the capabilities of device 161, server 190 may transmit signaling to device 161 to indicate that the call is no longer placed on hold. Also, in response to receiving and interpreting the SMS message, server 190 generates an SMS message. The SMS message includes a SIP message. For example, the SIP message may be implemented as a 200 OK. Additionally, the SMS message includes SDP data (e.g., "a=send/recv" attribute). Server 190 transmits the SMS message to device 160 through the NAS. Additionally, server 190 resumes the media session between device 160 and device 161.

While FIG. 5 illustrates exemplary messaging and describes exemplary processes that provide the connection control service, according to other embodiments, device 160, network elements of LTE network 105 (e.g., MME 125, etc.), and/or server 190 may perform additional, different, and/or fewer operations to provide the connection control service.

Figure 6:
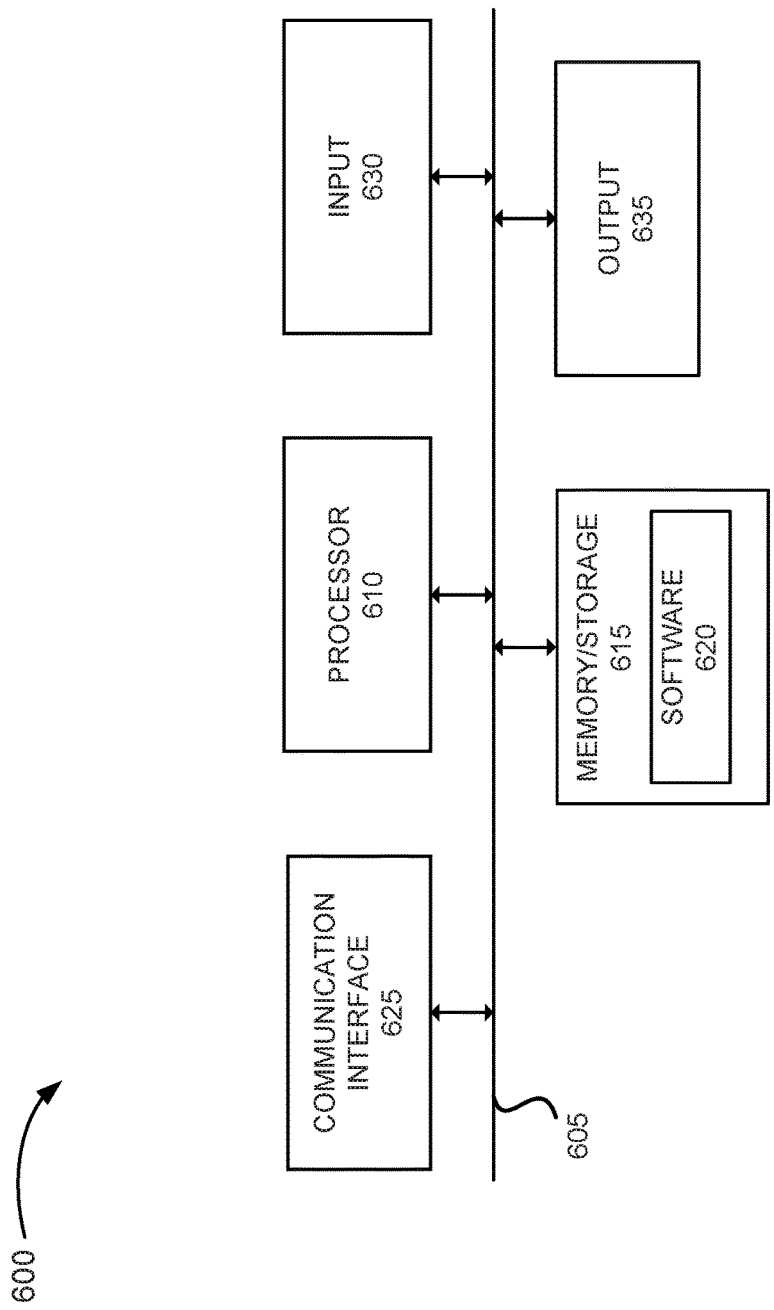
FIG. 6 is a diagram illustrating exemplary components of a device that may correspond to one or more of the devices illustrated in the exemplary environment of FIG. 1.

FIG. 6 is a diagram illustrating exemplary components of a device 600 that may correspond to one or more of the devices in environment 100. For example, device 600 may correspond to eNB 110, SGW 115, PGW 120, MME 125, HSS 130, PCRF 135, OFCS 145, device 160, device 161, SMS-IWF 180, SMSC 185, and server 190. As illustrated in FIG. 6, according to an exemplary embodiment, device 600 includes a bus, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.).

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 615 may include a hard disk (e.g., a magnetic disk, an optical disk, a magneto-optic disk, a solid state disk, etc.) and a corresponding drive. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 615 may store data, software, and/or instructions related to the operation of device 600.

Software 620 includes an application or a program that provides a function and/or a process. As an example, with reference to device 160 and server 190, software 620 may include an application that, when executed by processor 610, provides the functions of the connection control service, as described herein. Similarly, other elements of LTE network 105 may include an application that, when executed by processor 610, provides the functions of the connection control service, as described herein. Software 620 is also intended to include firmware, middleware, microcode, hardware description language (HDL), and/or other form of instruction.

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
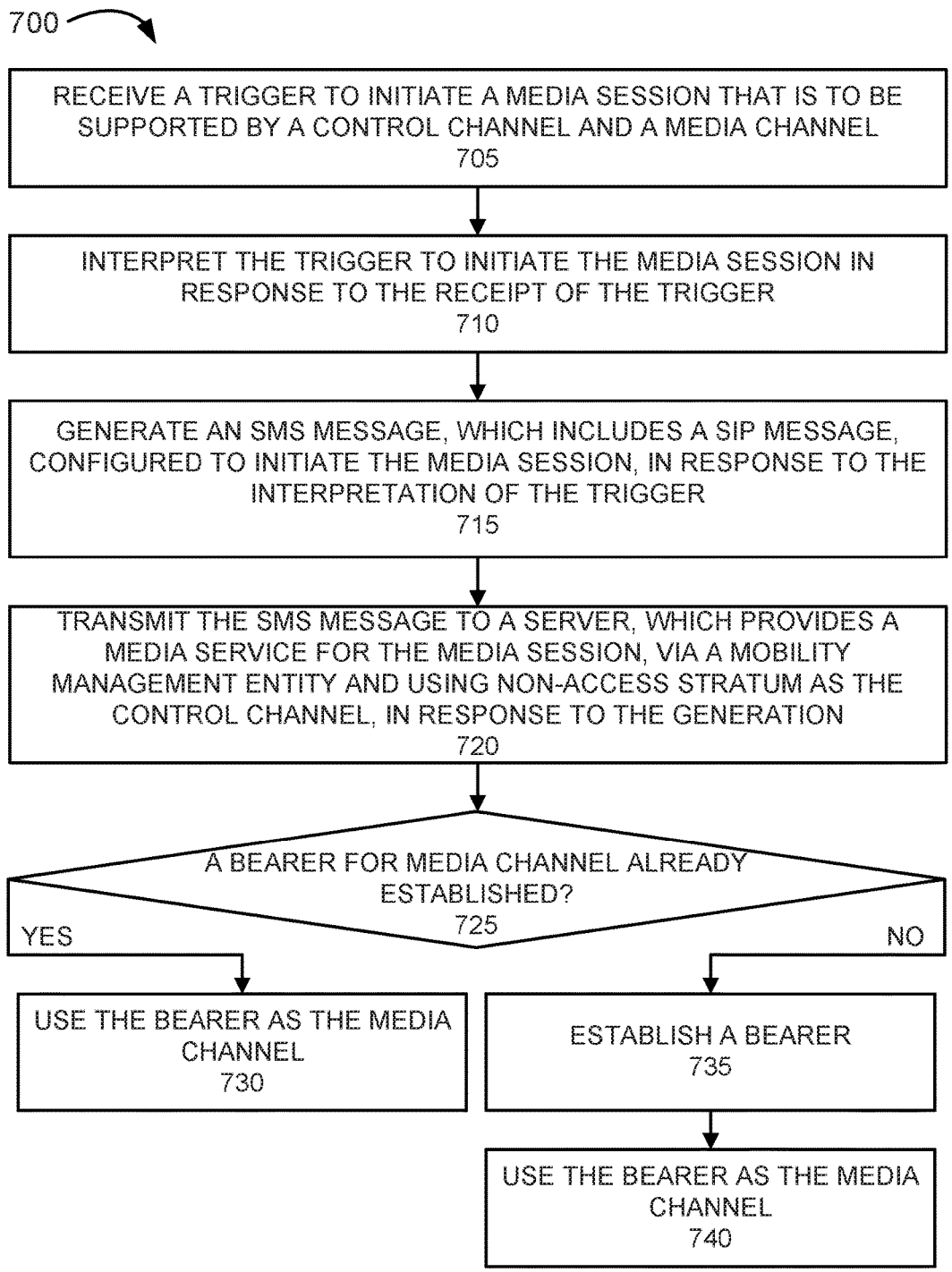
FIGS. 7-10 are flow diagrams that illustrate exemplary processes pertaining to the connection control service.

FIG. 7 is a flow diagram illustrating an exemplary process 700 pertaining to the connection control service. Process 700 is directed to a process previously described above with respect to FIG. 2, as well as elsewhere in this description, in which a device initiates a media session. According to an exemplary embodiment, device 160 performs steps of process 700. For example, processor 610 executes software 620 to perform the steps illustrated in FIG. 7 and described herein.

Referring to FIG. 7, block 705, process 700 begins with receiving a trigger to initiate a media session that is to be supported by a control channel and a media channel. For example, user 155 of device 160 may enter a user input that serves as a triggering event to initiate the media session. By way of further example, user 155 may cause an end user application to launch (e.g., open) or user 155 may enter some other type of input, such as entering a telephone number, selecting a contact from a contacts list, etc. According to other examples, the trigger may be the completion of a power-up (e.g., boot-up) process of device 160 or when device 160 exits a particular mode (e.g., airplane mode) to another mode (e.g., normal mode).

In block 710, the trigger to initiate the media session is interpreted in response to the receipt of the trigger. For example, device 160 interprets the trigger and identifies that the media session is to be established. Depending on the type of trigger, device 160 may use various types of information to interpret the trigger and/or identify that the media session is to be established, such as the end user application, user preferences, etc.

In block 715, an SMS message is generated, which includes a SIP message that is configured to initiate the media session, in response to the interpretation of the trigger. For example, device 160 generates an SMS message. The SMS message includes a SIP message. For example, the SIP message is a SIP INVITE message. The SMS message may include SDP data pertaining to the media session. Device 160 may encapsulate the SIP message and other data (e.g., SDP data) in the payload portion of the SMS message.

In block 720, the SMS message is transmitted to a server, which provides a media service for the media session, via an MME and using the NAS as the control channel, in response to the generation. For example, device 160 transmits the SMS message to server 190 via MME 125 and SMS devices (e.g., SMS-IWF 180 and SMSC 185).

In block 725, it is determined whether an eligible bearer for the media channel already is established. For example, device 160 determines whether a bearer is already established that can be used as the media channel of the media session. Device 160 may store various types of information that may be used to determine whether to establish a bearer, such as an uplink traffic flow template (UL-TFT), QoS parameters (e.g., QoS Class Identifier (QCI), Allocation and Retention Policy (ARP), APN-Aggregate Maximum Bit Rate, Guaranteed Bit Rate (GBR), Maximum Bit Rate (MBR), etc.), a PDN ID (e.g., an APN), etc.

When it is determined that an eligible bearer for the media channel is already established (block 725—YES), the bearer is used as the media channel (block 730). For example, device 160 may use the bearer for media flow associated with the media session.

When it is determined that a bearer for the media channel is not already established (block 725—NO), the bearer is established (block 735). For example, device 160 initiates the establishment of a bearer (e.g., dedicated, default) via PGW 120. In block 740, the bearer is used as the media channel. For example, device 160 may use the bearer for media flow associated with the media session.

Although FIG. 7 illustrates an exemplary process 700 of the connection control service, according to other embodiments, process 700 may include additional operations, fewer operations, and/or different operations than those illustrated in FIG. 7 and described. For example, as previously described, device 160 may receive SMS messages from server 190 in relation media progress. Additionally, device 160 may receive a token from server 190. Also, device 160 may receive time window data, which indicate timer T1 and/or timer T2, from server 190. Alternatively, device 160 may be configured with corresponding timers. In either case, device 160 may start and monitor the timers in view of the tasks to which the timers apply.

Figure 8:
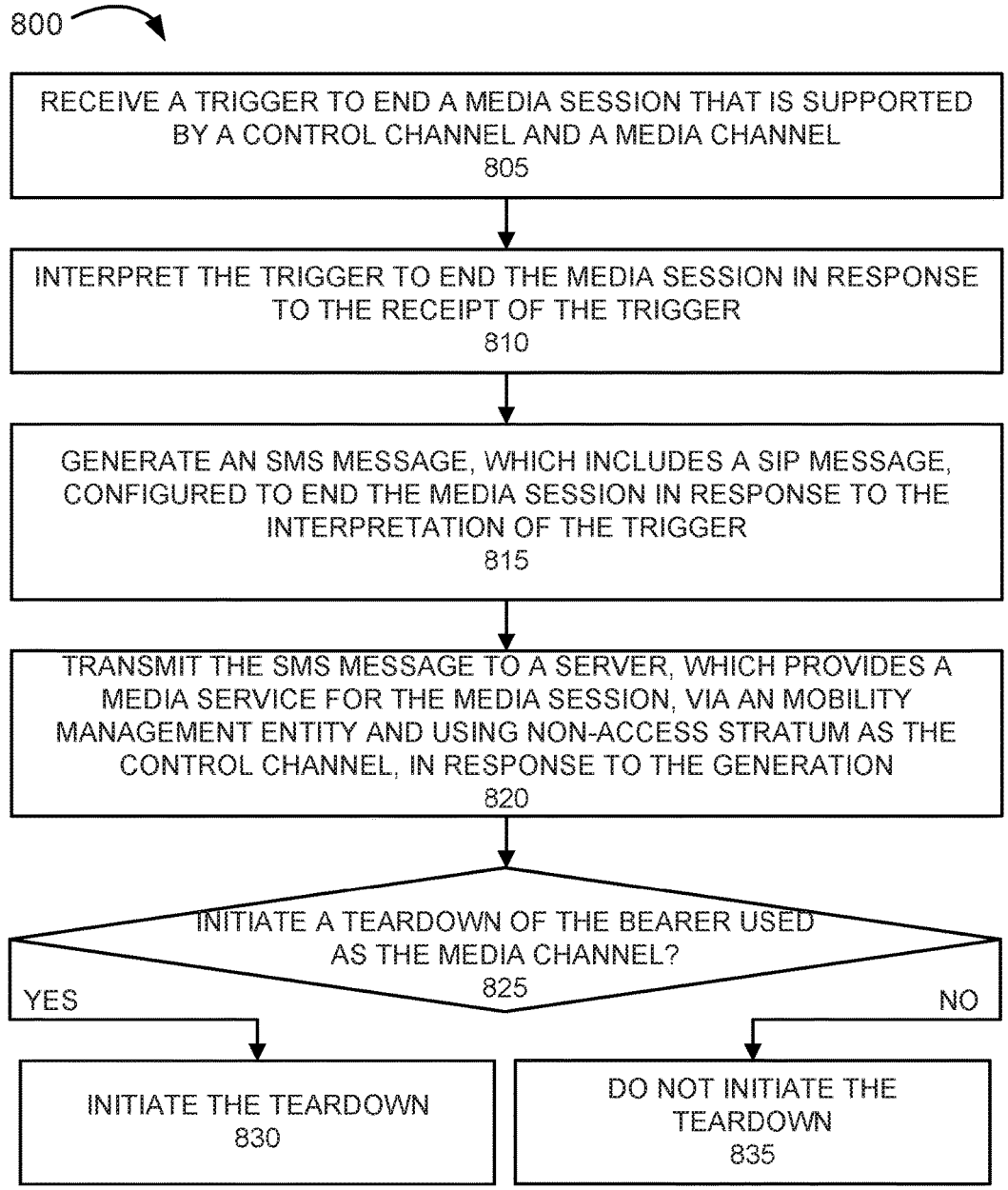

FIG. 8 is a flow diagram illustrating an exemplary process 800 pertaining to the connection control service. Process 800 is directed to a process previously described above with respect to FIG. 4, as well as elsewhere in this description, in which a device may end a media session. According to an exemplary embodiment, device 160 performs steps of process 800. For example, processor 610 executes software 620 to perform the steps illustrated in FIG. 8 and described herein.

Referring to FIG. 8, block 805, process 800 begins with receiving a trigger to end a media session that is to be supported by a control channel and a media channel. For example, user 155 of device 160 may enter a user input that serves as a triggering event to end the media session. By way of further example, user 155 may cause an end user application to close or user 155 may enter some other type of input (e.g., select an element of a graphical user interface of the end user application, etc.).

In block 810, the trigger to end the media session is interpreted in response to the receipt of the trigger. For example, device 160 interprets the trigger and identifies that the media session is to end. Depending on the type of trigger, device 160 may use various types of information to interpret the trigger and/or identify that the media session is to end, such as the end user application, etc.

In block 815, an SMS message is generated, which includes a SIP message that is configured to end the media session, in response to the interpretation of the trigger. For example, device 160 generates an SMS message. The SMS message includes a SIP message. For example, the SIP message is a SIP BYE message. Device 160 may encapsulate the SIP message in the payload portion of the SMS message.

In block 820, the SMS message is transmitted to a server, which provides a media service for the media session, via an MME and using the NAS as the control channel, in response to the generation. For example, device 160 transmits the SMS message to server 190 via MME 125 and SMS devices (e.g., SMS-IWF 180 and SMSC 185).

In block 825, it is determined whether to initiate a teardown of a bearer that is used as the media channel. For example, if an existing bearer created by another application at device 160 was used to support the media portion of the media session, then device 160 may determine to not tear down the bearer. Alternatively, if the existing bearer had been created to support the media portion but another application at device 160 could use the bearer, then device 160 may determine to not tear down the bearer. According to another example, if device 160 determines that the bearer will not be used or is currently not be used, device 160 may determine to tear down the bearer. Thus, when it is determined to initiate a teardown of the bearer (block 825—YES), the teardown is initiated (block 830). For example, device 160 transmits a PDN disconnect request to MME 125. In turn, MME 125 may transmit a delete session request to PGW 120. In response to receiving the delete session request, PGW 120 may tear down the bearer. Alternatively, when it is determined to not initiate a teardown of the bearer (block 825—NO), the teardown is not initiated (block 835). For example, device 160 does not initiate a PDN disconnection procedure.

Although FIG. 8 illustrates an exemplary process 800 of the connection control service, according to other embodiments, process 800 may include additional operations, fewer operations, and/or different operations than those illustrated in FIG. 8 and described.

Figure 9:
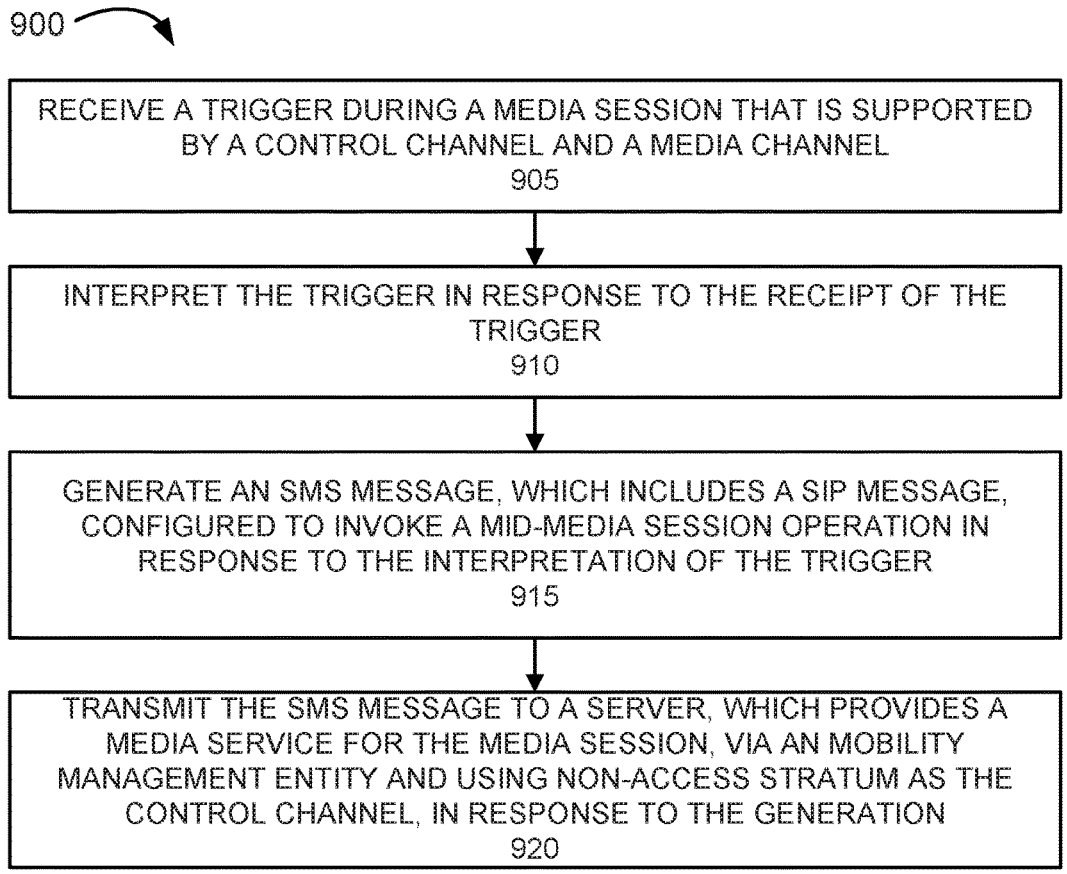

FIG. 9 is a flow diagram illustrating an exemplary process 900 pertaining to the connection control service. Process 900 is directed to a process previously described above with respect to FIG. 5, as well as elsewhere in this description, in which a device invokes a mid-media session operation during the media session. According to an exemplary embodiment, device 160 performs steps of process 900. For example, processor 610 executes software 620 to perform the steps illustrated in FIG. 9 and described herein.

Referring to FIG. 9, block 905, process 900 begins with receiving a trigger during a media session that is to be supported by a control channel and a media channel. For example, user 155 of device 160 may enter a user input that serves as a triggering event to initiate a mid-media session operation. By way of further example, the mid-media session operation may pertain to call waiting, call hold, call transfer, conference call, etc.

In block 910, the trigger to perform the mid-media session operation is interpreted in response to the receipt of the trigger. For example, device 160 interprets the trigger and identifies that the mid-media session operation to be performed. Depending on the type of trigger, device 160 may use various types of information to interpret the trigger and/or identify the mid-media operation, such as the end user application.

In block 915, an SMS message is generated, which includes a SIP message that is configured to invoke the mid-media session operation, in response to the interpretation of the trigger. For example, device 160 generates an SMS message. The SMS message includes a SIP message. For example, the SIP message may be a SIP INVITE message or other type of SIP message configured to indicate a particular mid-media session operation. The SMS message may include SDP data pertaining to the mid-media session operation.

In block 920, the SMS message is transmitted to a server, which provides a media service for the media session, via an MME and using the NAS as the control channel, in response to the generation. For example, device 160 transmits the SMS message to server 190 via MME 125 and SMS devices (e.g., SMS-IWF 180 and SMSC 185).

Although FIG. 9 illustrates an exemplary process 900 of the connection control service, according to other embodiments, process 900 may include additional operations, fewer operations, and/or different operations than those illustrated in FIG. 9 and described. For example, depending on the type of mid-media session operation, process 900 may repeat. For example, in a call waiting or a call hold scenario, user 155 may multiple user inputs to switch from a first media session to a second media session and then to switch back or resume the first media session.

Figure 10:
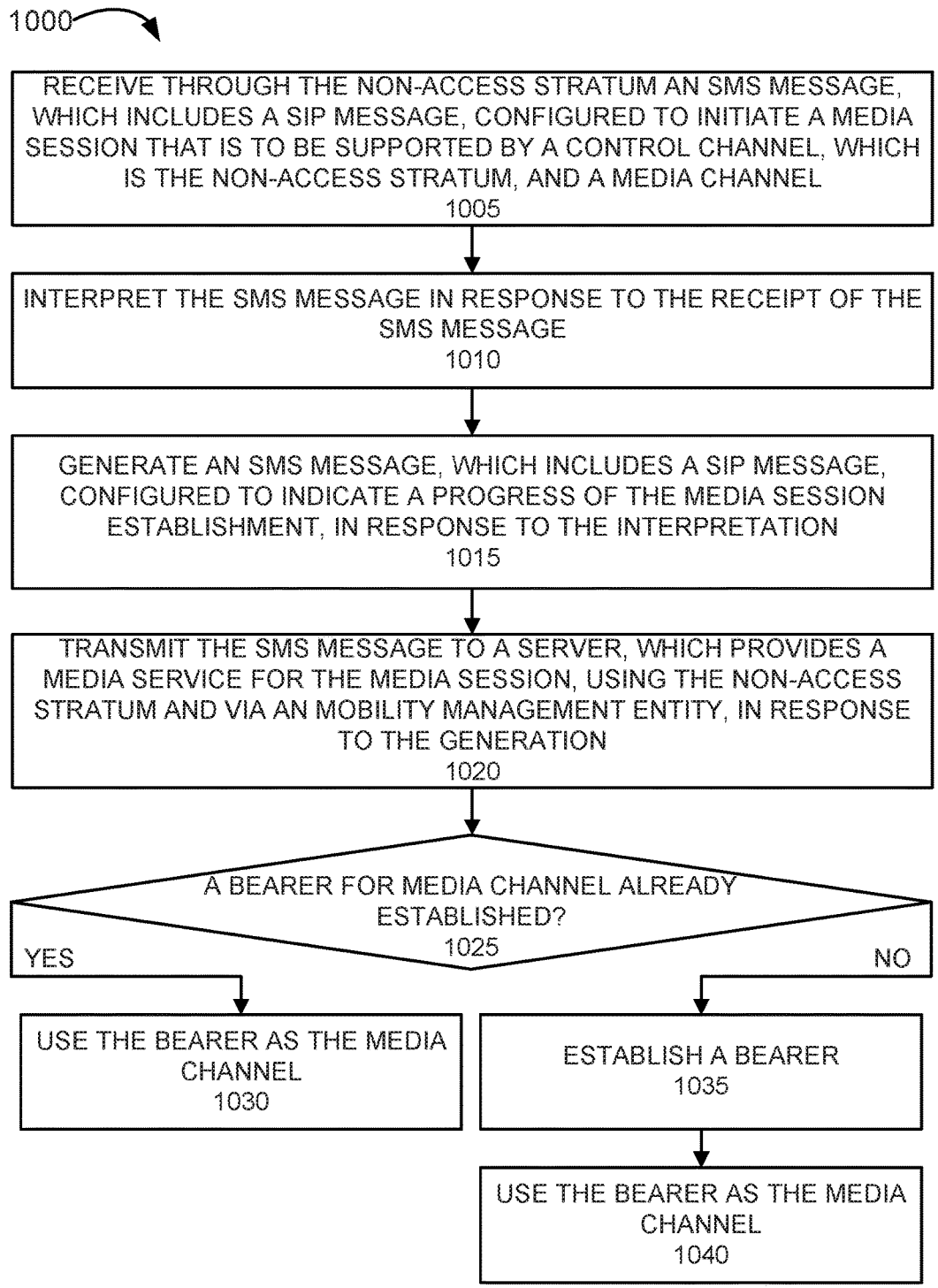

FIG. 10 is a flow diagram illustrating an exemplary process 1000 pertaining to the connection control service. Process 1000 is directed to a process previously described above with respect to FIG. 3, as well as elsewhere in this description, in which another device initiates an establishment of a media session with a device. According to an exemplary embodiment, device 160 performs steps of process 1000. For example, processor 610 executes software 620 to perform the steps illustrated in FIG. 10 and described herein.

Referring to FIG. 10, block 1005, process 1000 begins with receiving through the NAS an SMS message, which includes a SIP message, configured to initiate a media session that is to be supported by a control channel, which is the NAS, and a media channel. For example, the SIP message may be a SIP INVITE.

In block 1010, the SMS message is interpreted in response to the receipt of the SMS message. For example, device 160 interprets the SMS message as a request to initiate a media session.

In block 1015, an SMS message is generated, which includes a SIP message that is configured to indicate a progress of the media session establishment, in response to the interpretation. For example, device 160 generates an SMS message. The SMS message includes a SIP message. For example, the SIP message may be a SIP 180, a SIP 183, or other type of SIP message. The SMS message may include SDP data pertaining to the progress.

In block 1020, the SMS message is transmitted to a server, which provides a media service for the media session, via an MME and using the NAS as the control channel, in response to the generation. For example, device 160 transmits the SMS message to server 190 via MME 125 and SMS devices (e.g., SMS-IWF 180 and SMSC 185).

In block 1025, it is determined whether a bearer for the media channel already is established. For example, device 160 determines whether an eligible bearer is already established that can be used as the media channel of the media session. Device 160 may store various types of information that may be used to determine whether to establish a bearer, such as an uplink traffic flow template (UL-TFT), QoS parameters (e.g., QoS Class Identifier (QCI), Allocation and Retention Policy (ARP), APN-Aggregate Maximum Bit Rate, Guaranteed Bit Rate (GBR), Maximum Bit Rate (MBR), etc.), a PDN ID (e.g., an APN), etc.

When it is determined that an eligible bearer for the media channel is already established (block 1025—YES), the bearer is used as the media channel (block 1030). For example, device 160 may use the bearer for media flow associated with the media session.

When it is determined that a bearer for the media channel is not already established (block 1025—NO), the bearer is established (block 1035). For example, device 160 initiates the establishment of a bearer (e.g., dedicated, default) via PGW 120. In block 1040, the bearer is used as the media channel. For example, device 160 may use the bearer for media flow associated with the media session.

Although FIG. 10 illustrates an exemplary process 1000 of the connection control service, according to other embodiments, process 1000 may include additional operations, fewer operations, and/or different operations than those illustrated in FIG. 10 and described. For example, as previously described, device 160 may transmit an SMS message to server 190 when user 155 answers a call, etc. Additionally, device 160 may receive a token from server 190. Also, device 160 may receive time window data, which indicate timer T1/T3 and/or timer T2/T4, from server 190. Alternatively, device 160 may be configured with corresponding timers. In either case, device 160 may start and monitor the timers in view of the tasks to which the timers apply.

Figure 11A:
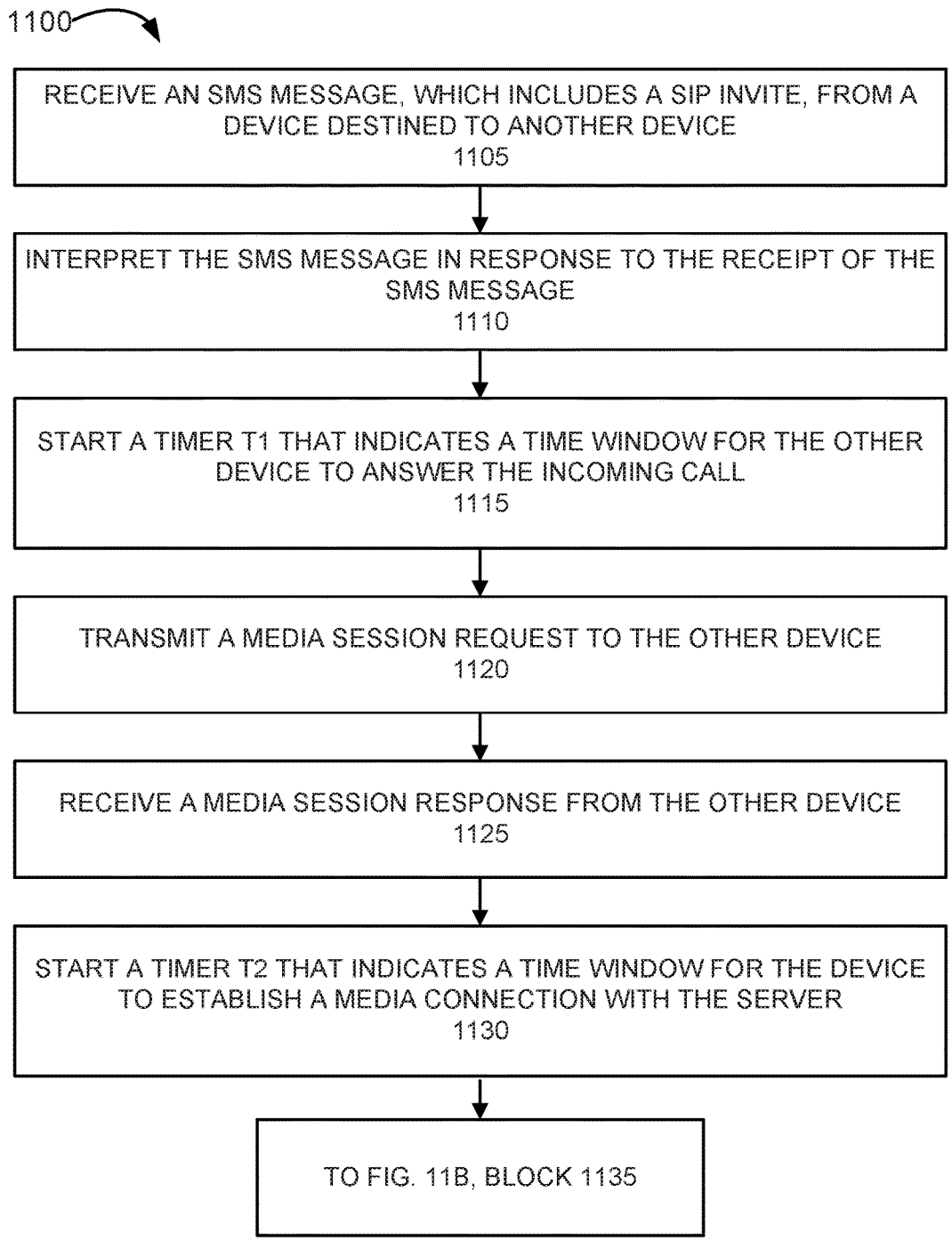
FIGS. 11A and 11B are flow diagrams that illustrate another exemplary process pertaining to the connection control service.
Figure 11B:
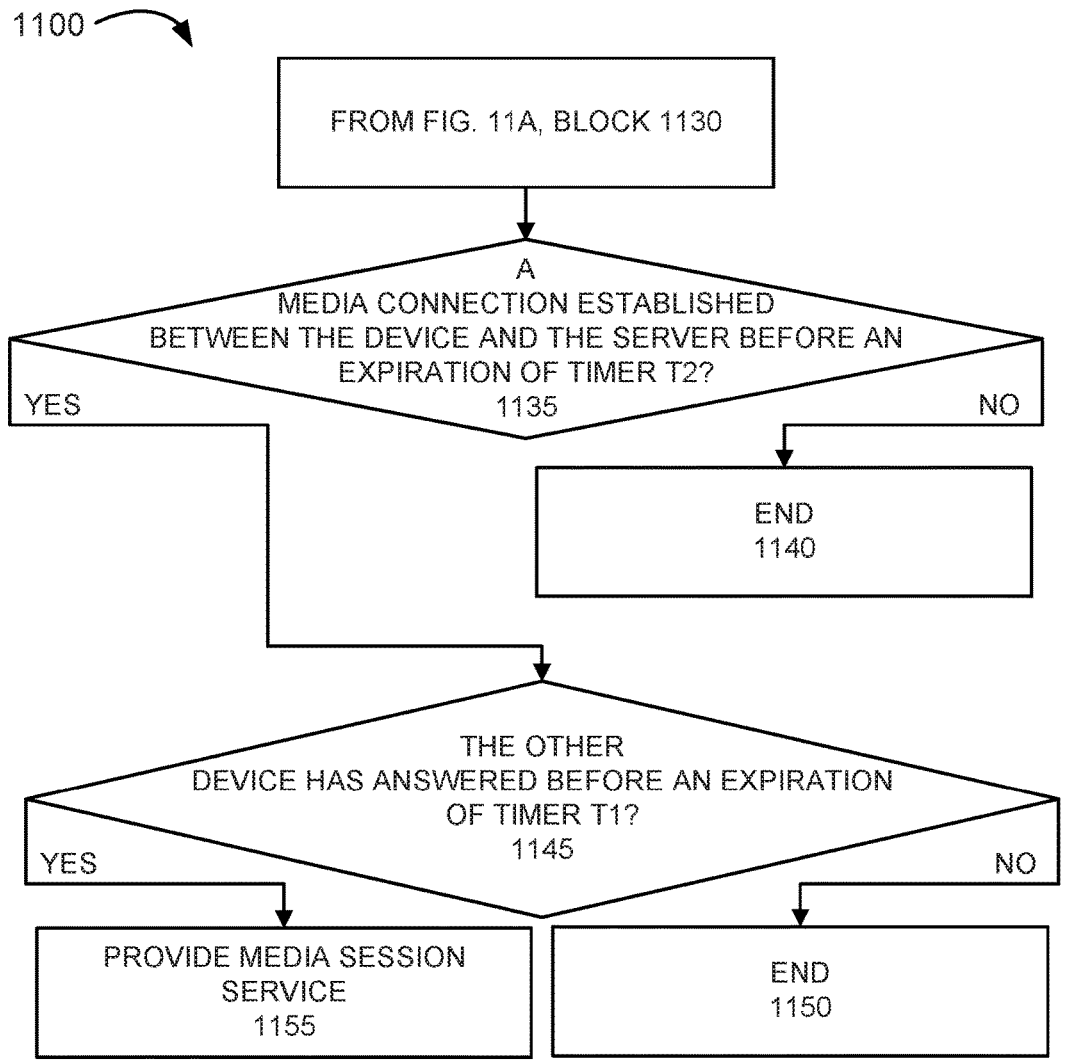

FIGS. 11A and 11B are flow diagrams illustrating an exemplary process 1100 pertaining to the connection control service. Process 1100 is directed to a process previously described above with respect to FIG. 2, as well as elsewhere in this description, in which a server device facilitates the establishment of a media session according to an outgoing call scenario. According to an exemplary embodiment, server 190 performs steps of process 1100. For example, processor 610 executes software 620 to perform the steps illustrated in FIGS. 11A and 11B, and described herein.

Referring to FIG. 11A, block 1105, process 1100 begins with receiving an SMS message, which includes a SIP message. For example, server 190 may receive the SMS message that includes a SIP INVITE. The SMS message may originate from device 160 and is transmitted to server 190 via SMSC 185. The SMS message may be destined to device 161.

In block 1110, the SMS message is interpreted in response to the receipt of the SMS message. For example, server 190 interprets the SMS message, which includes the SIP INVITE.

In block 1115, a timer T1 is started. For example, server 190 starts the timer T1, which indicates a time window for the called device 161 to answer the call from device 160. According to various exemplary implementations, server 190 may start the timer T1 before, after, or concurrently relative to resolving the called party.

In block 1120, a media session request is transmitted to the other device. For example, server 190 may transmit a SIP INVITE or an IAM to device 161. In block 1125, a media session response is received. For example, server 190 may receive from device 161 an ACM or a SIP 200 OK.

In block 1130, a timer T2 is started. For example, server 190 starts the timer T2, which indicates a time window for device 160 to establish a media connection with server 190. According to various exemplary implementations, server 190 may start the timer T2 before, after, or concurrently relative to transmitting the media session response to device 160.

Referring to FIG. 11B, and during media session establishment, in block 1135, it is determined whether a media connection between the device and the server is established before an expiration of the timer T2. For example, server 190 may monitor the timer T2 and determine whether the timer T2 has expired before device 160 has established a media connection (e.g., via a bearer) with server 190.

When it is determined that the timer T2 has expired before the establishment of the media connection (block 1135—NO), then process 1100 may end (block 1140). For example, server 190 may release any resources associated with the media session allocated so far, notify device 160 and/or device 161 of the failure, etc.

When it is determined that the timer T2 has not expired before the establishment of the media connection (block 1135—YES), it may be determined whether the outgoing call from device 160 to device 161 has been answered before an expiration of timer T1. For example, server 190 may monitor the timer T1 and determine whether the timer T1 has expired before the call has been answered by the user 155-2 at device 161.

When it is determined that the timer T1 has expired before the establishment of the end-to-end media session (block 1145—NO), then process 1100 may end (block 1150). For example, server 190 may release any resources associated with the media session allocated so far, notify device 160 and/or device 161 of the failure, etc.

When it is determined that the timer T1 has not expired before the called party has answered the call (block 1145—YES), then a media session service is provided (block 1155). For example, server 190 may continue to provide a voice service, a voice and video service, etc., in support of the media session that has been established when user 155-2 at device 161 has answered the call before timer T1 has expired.

Although FIGS. 11A and 11B illustrate an exemplary process 1100 of the connection control service, according to other embodiments, process 1100 may include additional operations, fewer operations, and/or different operations than those illustrated in FIGS. 11A and 11B, and described herein. For example, blocks 1115, 1125, and 1130 may be performed independently or simultaneously.

Figure 12A:
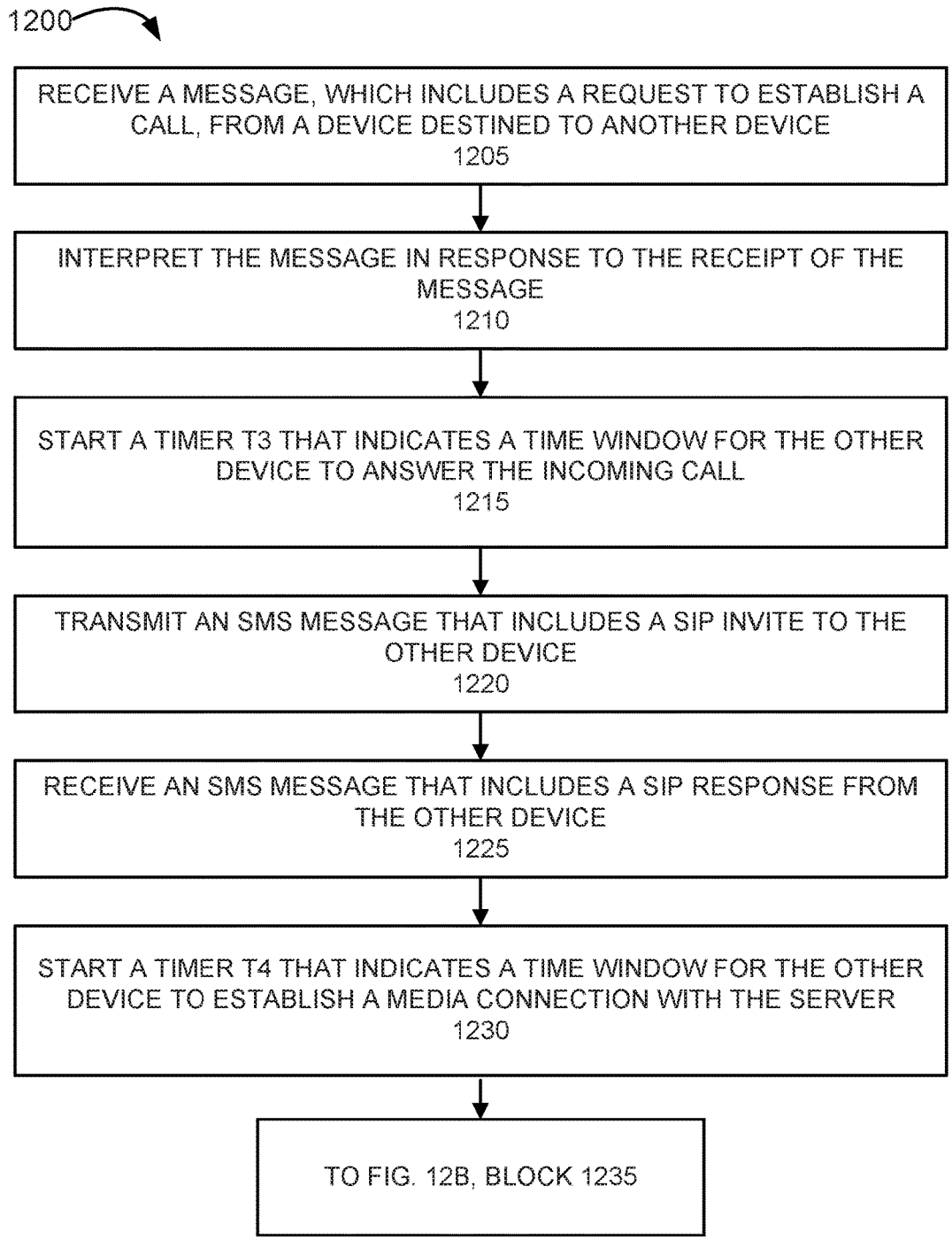
FIGS. 12A and 12B are flow diagrams that illustrate yet another exemplary process pertaining to the connection control service.
Figure 12B:
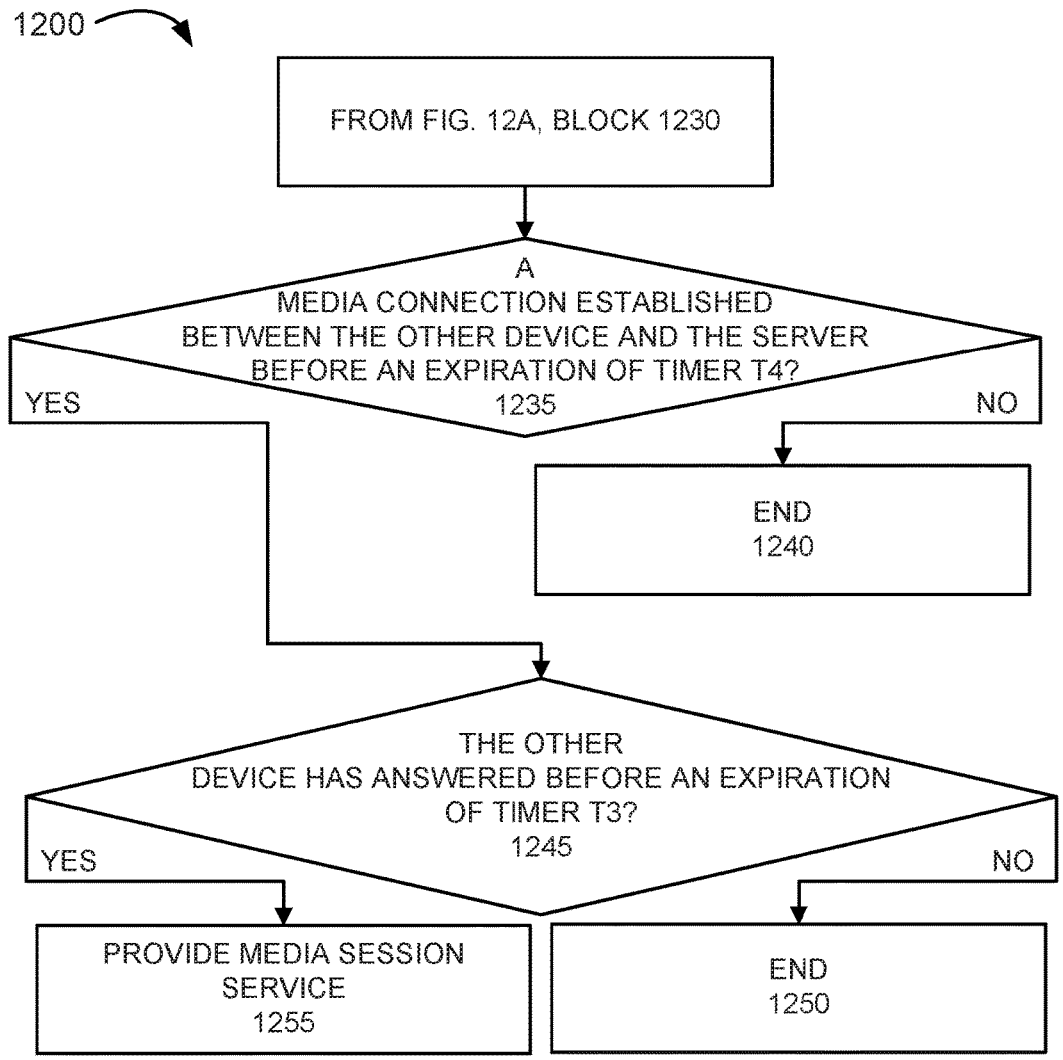

FIGS. 12A and 12B are flow diagrams illustrating an exemplary process 1200 pertaining to the connection control service. Process 1200 is directed to a process previously described above with respect to FIG. 3, as well as elsewhere in this description, in which a server device facilitates the establishment of a media session according to an incoming call scenario. According to an exemplary embodiment, server 190 performs steps of process 1200. For example, processor 610 executes software 620 to perform the steps illustrated in FIGS. 12A and 12B, and described herein.

Referring to FIG. 12A, block 1205, process 1200 begins with receiving a message that includes a request to establish a call. For example, server 190 may receive an ISUP IAM. The ISUP IAM may originate from device 160 and is transmitted to server 190. The ISUP IAM may include data to be used to establish the call with device 160.

In block 1210, the message is interpreted in response to the receipt of the message. For example, server 190 interprets the SMS message, which includes the SIP INVITE.

In block 1215, a timer T3 is started. For example, server 190 starts the timer T3, which indicates a time window for the called device 160 to answer the call from device 161. According to various exemplary implementations, server 190 may start the timer T3 before, after, or concurrently relative to resolving the called party.

In block 1220, an SMS message, which includes a SIP INVITE, is transmitted to the other device. For example, server 190 may transmit a SIP INVITE to device 160. In block 1225, an SMS message, which includes a SIP message, is received. For example, server 190 may receive from device 160 a SIP 180 message (e.g., ringing) or other SIP message pertaining to session progress.

In block 1230, a timer T4 is started. For example, server 190 starts the timer T4, which indicates a time window for device 160 to establish a media connection with server 190. According to various exemplary implementations, server 190 may start the timer T4 before, after, or concurrently relative to transmitting the media session response to device 161.

Referring to FIG. 12B, and during media session establishment, in block 1235, it is determined whether a media connection between the device and the server is established before an expiration of the timer T4. For example, server 190 may monitor the timer T4 and determine whether the timer T4 has expired before device 160 has established a media connection (e.g., via a bearer) with server 190.

When it is determined that the timer T4 has expired before the establishment of the media connection (block 1235—NO), then process 1200 may end (block 1240). For example, server 190 may release any resources associated with the media session allocated so far, notify device 160 and/or device 161 of the failure, etc.

When it is determined that the timer T4 has not expired before the establishment of the media connection (block 1235—YES), it may be determined whether the outgoing call from device 161 to device 160 has been answered before an expiration of timer T3. For example, server 190 may monitor the timer T3 and determine whether the timer T3 has expired before the call has been answered by the user 155-1 at device 160.

When it is determined that the timer T3 has expired before the establishment of the end-to-end media session (block 1245—NO), then process 1200 may end (block 1250). For example, server 190 may release any resources associated with the media session allocated so far, notify device 160 and/or device 161 of the failure, etc.

When it is determined that the timer T3 has not expired before the called party has answered the call (block 1245—YES), then a media session service is provided (block 1255). For example, server 190 may continue to provide a voice service, a voice and video service, etc., in support of the media session that has been established when user 155-1 at device 160 has answered the call before the timer T3 has expired.

Although FIGS. 12A and 12B illustrate an exemplary process 1200 of the connection control service, according to other embodiments, process 1200 may include additional operations, fewer operations, and/or different operations than those illustrated in FIGS. 12A and 12B, and described herein. For example, blocks 1215, 1225, and 1230 may be performed independently or simultaneously.

The foregoing description of embodiments provides illustration, but is not intended to be exhaustive or to limit the embodiments to the precise form disclosed. Accordingly, modifications to the embodiments described herein may be possible. For example, although environment 100 includes an LTE network, according to other embodiments, LTE network 105 may be implemented as an LTE Advanced network or a future generation wireless network.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7-10, 11A, 11B, 12A, and 12B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 610, etc.), or a combination of hardware and software (e.g., software 620). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment,"

"an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 610) of a computational device. A non-transitory storage medium includes one or more of the storage mediums described in relation to memory/storage 615.

No element, act, or instruction described in the present application should be construed as critical or essential to the embodiments described herein unless explicitly described as such.

What is claimed is:

1. A method comprising:
   generating, by an end device, a first Short Message Service (SMS) message, which includes a first Session Initiation Protocol (SIP) message configured to initiate or end a media session that is supported by a control channel and a media channel;
   transmitting, by the end device in response to the generating, the first SMS message that includes the first SIP message to a server via a mobility management entity and using non-access stratum as the control channel;
   establishing, by the end device subsequent to the transmitting, an end-to-end connection for the media session using a bearer, via a packet data network gateway (PGW), as the media channel when the first SIP message is configured to initiate the media session; and
   ending, by the end device subsequent to the transmitting, the media session when the first SIP message is configured to end the media session.

2. The method of claim 1, wherein, when the first SIP message is configured to initiate the media session, the first SIP message includes a SIP INVITE, and the generating comprises:
   encapsulating the first SIP message in a payload portion of the first SMS message.

3. The method of claim 1, further comprising:
   receiving, by the end device via the control channel when the first SIP message is configured to initiate the media session, a second SMS message that includes an authentication token and a second SIP message configured to indicate a progress of the media session; and
   determining whether the bearer for the media channel is already established in response to receiving the second SMS message.

4. The method of claim 3, further comprising:
   transmitting, by the end device via the bearer, the authentication token to the server with a request to establish the media channel with the server based on receiving the second SMS message and the second SIP message.

5. The method of claim 1, further comprising:
   receiving, by the end device, a mid-media session request from a user of the end device during the media session;
   generating, by the end device, a second SMS message, which includes a second SIP message configured to invoke a mid-media session operation during the media session, in response to the receiving of the mid-media session request;
   transmitting, by the end device via the control channel, the second SMS message that includes the second SIP message to the server via the mobility management entity, in response to the generating of the second SMS message; and
   performing the mid-media session operation based on the second SMS message.

6. The method of claim 5, wherein the mid-media session request includes one of a call waiting request, a call hold request, a call transfer request, or a conference call request.

7. The method of claim 1, further comprising:
   assigning, by the server, a first timer during which the end device has to establish the bearer for the media channel; and
   assigning, by the server, a second timer during which the end device has to establish an end-to-end media session with another device.

8. The method of claim 1, wherein the establishing further comprises:
   establishing, by the end device, the bearer as the media channel, via a packet data network gateway.

9. An end device comprising:
   a communication interface;
   a memory, wherein the memory stores instructions; and
   a processor, wherein the processor executes the instructions to:
   generate a first Short Message Service (SMS) message, which includes a first Session Initiation Protocol (SIP) message configured to initiate or end a media session that is supported by a control channel and a media channel;
   transmit, via the communication interface in response to the generation, the first SMS message that includes the first SIP message to a server via a mobility management entity and using non-access stratum as the control channel;
   establish, via the communication interface subsequent to the transmission, an end-to-end connection for the media session using a bearer, via a packet data network gateway (PGW), as the media channel when the first SIP message is configured to initiate the media session; and
   end, via the communication interface subsequent to the transmission, the media session when the first SIP message is configured to end the media session.

10. The end device of claim 9, wherein, when the first SIP message is configured to initiate the media session, the first SIP message includes a SIP INVITE, and wherein, when generating, the processor further executes the instructions to:

encapsulate the first SIP message in a payload portion of the first SMS message.

11. The end device of claim 9, wherein the processor further executes the instructions to:

receive, via the communication interface via the control channel when the first SIP message is configured to initiate the media session, a second SMS message that includes an authentication token and a second SIP message configured to indicate a progress of the media session; and determine whether the bearer for the media channel is already established in response to the receipt of the second SMS message.

12. The end device of claim 11, wherein the processor further executes the instructions to:

transmit, via the communication interface and the bearer, the authentication token with a request to establish the media channel with the server based on the receipt of the second SMS message and the second SIP message.

13. The end device of claim 9, wherein the processor further executes the instructions to:

receive a mid-media session request from a user of the end device during the media session;

generate a second SMS message, which includes a second SIP message configured to invoke a mid-media session operation during the media session, in response to the receipt of the mid-media session request;

transmit, via the communication interface and the control channel, the second SMS message that includes the second SIP message to the server via the mobility management entity, in response to the generation of the second SMS message; and perform the mid-media session operation.

14. The end device of claim 13, wherein the mid-media session request includes one of a call waiting request, a call hold request, a call transfer request, or a conference call request.

15. The end device of claim 9, wherein, when establishing, the processor further executes the instructions to:

establish, via the communication interface, the bearer as the media channel, via a packet data network gateway.

16. A non-transitory computer-readable storage medium storing instructions executable by a processor of a device, which when executed cause the device to:

generate a first Short Message Service (SMS) message, which includes a first Session Initiation Protocol (SIP) message configured to initiate or end a media session that is supported by a control channel and a media channel;

transmit, via non-access stratum as the control channel in response to the generation, the first SMS message that includes the first SIP message to a server via a mobility management entity;

establish, subsequent to the transmission, an end-to-end connection for the media session using a bearer, via a packet data network gateway (PGW), as the media channel when the first SIP message is configured to initiate the media session; and end, subsequent to the transmission, the media session, when the first SIP message is configured to end the media session.

17. The non-transitory computer-readable storage medium of claim 16, wherein, when the first SIP message is configured to initiate the media session, the first SIP message includes a SIP INVITE, and the non-transitory computer-readable storage medium further storing instructions executable by the processor of the device, which when executed cause the device to:

encapsulate the first SIP message in a payload portion of the first SMS message.

18. The non-transitory computer-readable storage medium of claim 16, further storing instructions executable by the processor of the device, which when executed cause the device to:

receive, via the control channel when the first SIP message is configured to initiate the media session, a second SMS message that includes an authentication token and a second SIP message that indicates a progress of the media session, and determine whether the bearer for the media channel is already established in response to the receipt of the second SMS message.

19. The non-transitory computer-readable storage medium of claim 16, further storing instructions executable by the processor of the device, which when executed cause the device to:

receive a mid-media session request from a user of the device during the media session;

generate a second SMS message, which includes a second SIP message configured to invoke a mid-media session operation during the media session, in response to the receipt of the mid-media session request;

transmit, via the control channel, the second SMS message that includes the second SIP message to the server via the mobility management entity, in response to the generation of the second SMS message; and perform the mid-media session operation.

20. The non-transitory computer-readable storage medium of claim 16, wherein the instructions to establish further storing instructions executable by the processor of the device, which when executed cause the device to:

establish the bearer as the media channel, via a packet data network gateway.

* * * * *